United States Patent [19]
Grisham et al.

[11] Patent Number: 6,004,386
[45] Date of Patent: *Dec. 21, 1999

[54] APPARATUS FOR CREATING GAS-LIQUID INTERFACIAL CONTACT CONDITIONS FOR HIGHLY EFFICIENT MASS TRANSFER

[75] Inventors: Thomas L. Grisham, Tyler; Janet K. Peters; Keith W. Sharp, both of Houston; Edward E. Ebel, Mabank, all of Tex.

[73] Assignee: RevTech Industries, Inc., Houston, Tex.

[*] Notice: This patent is subject to a terminal disclaimer.

[21] Appl. No.: 08/920,831

[22] Filed: Aug. 29, 1997

Related U.S. Application Data

[60] Division of application No. 08/617,416, Mar. 18, 1996, Pat. No. 5,662,811, and a continuation-in-part of application No. 08/492,766, Jun. 21, 1995, Pat. No. 5,529,701, said application No. 08/617,416, is a continuation-in-part of application No. 08/406,502, Mar. 20, 1995, Pat. No. 5,531,904.

[51] Int. Cl.⁶ .................................................. B01D 21/26
[52] U.S. Cl. .......................... 96/202; 96/216; 210/221.2; 210/512.1
[58] Field of Search .............................. 95/156, 159, 185, 95/261; 96/156, 181, 202, 206, 216; 210/188, 221.2, 512.1, 702, 703, 718, 787, 804; 261/94, 95, 96, 97

[56] References Cited

U.S. PATENT DOCUMENTS

| | | | |
|---|---|---|---|
| 4,279,743 | 7/1981 | Miller | 210/220 |
| 4,397,741 | 8/1983 | Miller | 210/512.1 |
| 4,744,890 | 5/1988 | Miller et al. | 210/221.2 |
| 4,838,434 | 6/1989 | Miller et al. | 210/512.1 |
| 4,997,549 | 3/1991 | Atwood | 210/512.1 |
| 5,470,465 | 11/1995 | Moorehead et al. | 210/221.2 |
| 5,529,701 | 6/1996 | Grisham et al. | 210/221.2 |

*Primary Examiner*—C. Scott Bushey
*Attorney, Agent, or Firm*—Ronald B. Sefrna

[57] ABSTRACT

Apparatus for creating gas-liquid interfacial contact conditions for highly efficient mass transfer between gas and liquid includes a gas-liquid contactor assembly including a hollow porous tube surrounded by an outer jacket defining a gas plenum between the jacket and the porous tube; a liquid feed assembly including a nozzle for injecting liquid into the porous tube in a spiraling flow pattern around and along the porous tube; a gas-liquid separator assembly at the first end of the porous tube including a nonporous degassing tube coaxially aligned with and connected to the porous tube, a gas outlet port coaxially aligned with the degassing tube to receive a first portion of gas flowing from the degassing tube, a first gas duct coaxially aligned with and connected to the gas outlet duct to convey the first portion of gas therefrom; and a liquid collection assembly. A second gas discharge assembly to collect and convey gas from the first end of the porous tube is also disclosed.

45 Claims, 19 Drawing Sheets

APPARATUS FOR CREATING GAS-LIQUID INTERFACIAL CONTACT CONDITIONS FOR HIGHLY EFFICIENT MASS TRANSFER

RELATED APPLICATION DATA

This application is a divisional of application Ser. No. 08/617,416, filed Mar. 18, 1996, now U.S. Pat. No. 5,662,811, which is a continuation-in-part of application Ser. No. 08/406,502, filed Mar. 20, 1995, now U.S. Pat. No. 5,531,904, and application Ser. No. 08/492,766, filed Jun. 21, 1995, now U.S. Pat. No. 5,529,701.

FIELD OF THE INVENTION

The present invention generally relates to apparatus for contacting gas and liquid phases for interfacial interaction, and in its preferred embodiments more specifically relates to apparatus for creating and maintaining conditions of gas-liquid interfacial contact for highly efficient molecular mass transfer across the gas-liquid interface.

BACKGROUND OF THE INVENTION

Many chemical and evaporation process operations involve molecular mass transfer between a gas stream and a liquid stream across a gas-liquid interface. For example, in gas absorption operations, soluble components of a gas stream are transferred to and dissolved in a liquid stream; in desorption, or stripping, operations, volatile components from a liquid stream are transferred from the liquid to a gas stream; and in evaporation operations liquid is vaporized across the interface.

In multiple component systems, when material is transferred from one bulk phase to another bulk phase across the interface which separates the two phases, the resistance to mass transfer causes a concentration gradient to occur in each phase. As the transferring component moves across the phase interface, the component concentration in the phase from which the component transfers decreases at the interface, creating a concentration gradient as compared to the bulk concentration of that phase. The phase into which the component transfers then has a higher concentration of the transferring component near the interface compared to the bulk concentration of that phase. The concentration at the interface of the transferring component in the liquid or gaseous phase is generally unequal even if expressed in the same concentration units. The relative concentration in each phase is described by the laws of thermodynamic equilibrium.

In phase equilibria it is generally recognized that the concentration in the gaseous phase is related to the concentration in the liquid phase by a partition coefficient or equilibrium factor. Gas or vapor versus liquid or solvent phase equilibrium data have been studied and recorded for many chemical compounds in various solvents as a function of concentration, temperature, and pressure. Also, phase equilibrium behavior for complex mixtures of compounds in various solvents and solvent mixtures at various temperatures and pressures has been reported.

In general, the partitioning of a component between the vapor and liquid phases can be expressed by the following equation;

$$Y_A = K_A X_A$$

where $Y_A$ = mole fraction of component A in the vapor phase $X_A$ = mole fraction of component A in the liquid phase $K_A$ = equilibrium or partition coefficient for component A between the gas and liquid phases.

It is generally assumed that mass transfer between a volume of liquid and a volume of gas across an interfacial contact area is instantaneous, but the actual rate of transfer is subject to various limiting factors, including the rate of diffusion of component molecules through the liquid to or from the interface, and the rate of diffusion of component molecules through the gas from or to the interface. In any case, transfer between liquid and gas is always favored by maximizing the interfacial area relative to liquid and gas volumes, and in multiple component systems, by minimizing the distance of diffusion through the liquid to the interface.

The dynamics of mass transfer across a gas-liquid interface may be quantified. The rate of transfer of a compound at the gas-liquid interface has been derived by Bird, Stewart, and in Lightfoot, and expressed as $$N_A = (D_{AB} C_{AO}/\delta)(1-\Gamma)$$

where $N_A$ = molar flux (moles/$L^2$t) (L=length; t=time)

$D_{AB}$ = binary diffusivity for system A-B ($L^2$/t)

$C_{AO}$ = the interfacial concentration of A in the liquid phase, which is assumed to be at equilibrium with the gas phase at the interface (moles/$L^3$)

$\delta$ = film thickness (L)

$\Gamma = C_A/C_{AO}$ $C_A$ = concentration in the main body of the liquid.

The foregoing equation is taken from the book *Transport Phenomena*, R. Byron Bird, Warren E. Stewart, and Edwin N. Lightfoot, John Wiley & Sons, Inc., 1960 (at page 535).

Traditional methods of creating conditions for interfacial mass transfer include the use of simple aerated tanks, spray towers, bubble tray columns, and packed columns to create a gas-liquid interface. Traditional technology uses counter current, multiple equilibrium stages in order to take full advantage of the equilibrium conditions for the component to be transferred. Generally, the design of a tray or packed tower absorption or stripping column will incorporate a number of transfer units (theoretical plates) in series in order to achieve the desired final transfer performance. Within each theoretical plate or transfer unit the mass transfer dynamics attempt to reach equilibrium, based upon relative volumes of gas and liquid between which transfer may occur.

While these traditional methods and associated apparatus do achieve mass transfer, they are inefficient, requiring long processing times, large equipment volumes, and high overall gas to liquid volumetric flow ratios. The inefficiency associated with the traditional prior art approaches arises largely from the relatively low gas-liquid interfacial area to volumes provided by the equipment, and the relatively long liquid diffusion distances to an interface. As a result of the inefficient gas to liquid contact, the internal apparatus volume required for each transfer unit (i.e., the volume required for mass transfer equilibrium to be reached between given volumes of gas and liquid under established operating conditions) is large. With regard to traditional apparatus, comparisons are typically expressed in terms of the height of a transfer unit.

With traditional apparatus, such as tray towers and packed towers, the designer's ability to increase the rate of mass transfer within the apparatus (and thus decrease the apparatus volume for each transfer unit) by increasing the volumetric flow ratio of gas to liquid is limited by the need to avoid foaming and liquid entrainment in the gas stream.

It has been suggested that improved mass transfer performance in an operation for the gas stripping of volatile contaminants from a liquid stream may be achieved through the use of an air sparged hydrocyclone similar to designs used in the mineral processing industry for separation of solid particles from an aqueous suspension. Examples of particle separation methods and apparatus may be found in U.S. Pat. Nos. 4,279,743; 4,397,741; 4,399,027; 4,744,890; 4,838,434; and 4,997,549. Each of these references is specifically based upon the concept of passing bubbles of air through a suspension of solid particles so that hydrophobic particles attach to air bubbles and form a cohesive froth that may be removed from the apparatus. No interphase mass transfer is involved, and neither the method nor the apparatus design are concerned with the creation of gas-liquid contact conditions favorable for efficient interphase transfer. The conditions taught by those reference patents, characterized by significant foaming and liquid entrainment, are more characteristic of flooding conditions in tray towers or packed towers used for an interphase transfer operation.

In a 1993 paper ("A Novel High-Capacity Technology for Removing Volatile Organic Contaminants From Water", *Proceedings of Waste Stream Minimization and Utilization Innovative Concepts—An Experimental Technology Exchange,* Ye Yi, April, 1993) the use of an air sparging process and apparatus was proposed for an interphase mass transfer operation involving removal of volatile components from a liquid stream. More specifically, the paper proposed a continuous process in which contaminated water would be introduced into the interior of a porous tube in a swirl flow pattern and air would be introduced through the porous tube into the water flow. The porous tube was described as disposed in a vertical orientation and the contaminated water would be pumped into the tube at the top and allowed to swirl around the inner wall of the tube to the bottom, while air would be forced through the tube into contact with the water. The total air to water volumetric flow ratio of two (2) was disclosed in the paper for a single pass through the apparatus. The paper further taught that it will be necessary for the water to be recycled through the apparatus a number of times to achieve significant transfer performance.

Although the method parameters and apparatus design suggested by Yi appear to offer the potential for achieving an incremental improvement in the creation of gas-liquid contact conditions for interphase mass transfer, the approach remains well short of optimal, and the mass transfer efficiencies available remain low.

There remains a substantial and unfilled need for a method of optimizing gas-liquid interfacial contact conditions for efficient interphase mass transfer, and a need for apparatus in which optimal conditions can be economically created, controlled, and maintained.

SUMMARY OF THE INVENTION

The present invention provides a method of creating and maintaining physical conditions of gas phase and liquid phase interfacial contact so as to optimize the efficiency of interphase mass transfer, and also provides economical apparatus for effective utilization of the method. With the method and apparatus of the invention, interphase transfer equilibrium is achieved rapidly and within very compact transfer unit volumes, so that a substantially increased number of transfer operations may be performed at very high efficiency in a single pass through a compact processing unit. The present invention takes into account the significant differences between the physical mechanisms involved in the separation of particles from an aqueous slurry by agglomeration of relatively large particles onto bubbles of air, and the molecular transfer between a gas stream and a liquid stream across the gas-liquid interface. Though superficially similar on a gross scale, these mechanisms exhibit substantial differences in the physics of their operation.

The apparatus of the invention generally includes a cylindrical tube, open at both ends, with a porous wall and a hollow interior, a liquid feed assembly disposed at one end of the tube, a gas-liquid separator assembly disposed at the opposite end of the tube, an outlet liquid collection assembly, and a gas discharge assembly at one or both ends of the tube. The tube is surrounded by an outer jacket that encloses the porous wall and forms a gas plenum. The plenum may be divided into multiple segments or sections for controlling the distribution of the gas along the length of the tube.

Liquid is fed tangentially into the interior of the tube through the liquid feed assembly with sufficient pressure and flow rate to create a high velocity flow of the liquid in a thin film around and along the inner surface of the porous wall of the tube. When the liquid meets the interior of the tube the inlet velocity vector is divided into a radial velocity vector and a longitudinal velocity vector, which may be controlled by controlling the angle at which the liquid meets the interior of the tube. The high velocity flow of the liquid in a swirl pattern around the tube produces a centrifugal force of significant magnitude, acting to force the liquid against the inner surface of the tube with a velocity vector generally perpendicular to the longitudinal axis of the tube. The liquid velocity, and thus the outward acceleration, is sufficient to maintain the liquid film against the inner surface of the tube throughout its length.

Pressurized gas is introduced into the plenum between the jacket and the outer surface of the porous wall of the tube and forced through the porous wall. The gas exits the porous wall at its inner surface and is immediately contacted by the liquid, which is moving at high velocity relative to the wall and to the gas as it enters the interior of the tube. The gas is sheared from the porous wall by the rapidly moving liquid into a multitude of very fine bubbles, which are carried by the moving liquid in its swirl flow pattern radially around the inner surface of the porous wall, and longitudinally toward the liquid exit from the tube. The mixture of liquid and gas bubbles forms a two phase system that exists in a swirl pattern around and along the inner surface of the tube. The buoyancy of the bubbles relative to the liquid causes them to move toward the center of the tube against the centrifugal (outward) acceleration, through the froth created by the two phase flow as it moves around the inner surface of the tube. The gas exits from the two phase flow at the inner boundary created by the force field and is transported from the tube. Because the specific gravity of the liquid is much higher than the specific gravity of the gas, the centrifugal acceleration imposes a substantially higher force on the liquid than on the gas. The gas is thus able to move to the center of the tube while the liquid is forced toward the wall of the tube, controlling the froth created by the two phase flow, minimizing liquid entrainment with the gas in the central portion of the tube, and inducing a clean separation between the gas column at the center of the tube and the two phase froth along the surface of the tube.

As the bubbles pass through the liquid, mass is transferred on a molecular level between the liquid and the gas in accordance with the laws of thermodynamic equilibrium, and divides between the two as determined by the value of the appropriate partition coefficient and the initial concentration of the transferring component in each phase. In general, the concentrations of the transferring component in each bubble of gas and in the immediately surrounding liquid are at or closely approaching equilibrium when the gas in each bubble exits from the liquid to the gas column at the center of the tube. Each volume of gas passes through the liquid only once within the apparatus, and each passage is associated with an approach to equilibrium. Each passage conceptually approximates a theoretical plate or transfer unit within the apparatus.

A transfer unit is defined by a specific volume of gas in contact with a specific volume of liquid at any given time. On a differential basis this may be as small as a single bubble surrounded by liquid, which may be defined as a "bubble pair". As noted above, the specific volume of gas contacts the liquid only once as it moves through the two phase system within the designated transfer unit. The specific volume of gas and the specific volume of liquid within a transfer unit is controlled by the thickness of the film formed by the injected liquid stream, the initial or entry velocity of the gas as it moves through the wall of the porous tube, and the radial acceleration and rotation imparted to each bubble in relationship to the liquid (which is controlled by controlling the radial velocity of the two phase system flow). The entry velocity of the gas is assumed or controlled to be equal to the terminal velocity associated with the rise of the bubbles through the froth.

The number of turns within a single pass of a specific liquid volume through the apparatus is controlled by controlling the angle at which the liquid is injected, thereby determining the relative radial and longitudinal velocities. Controlling the radial and longitudinal velocities controls the radial acceleration acting on the bubbles, thus affecting the time the bubbles remain in contact with the liquid in the two phase flow within a transfer unit, as well as controlling the overall liquid residence time within a given tube length.

The number of turns, controlled by the angle of liquid injection and the overall length of the porous tube, combined with the distance that a bubble travels longitudinally while it moves from the point of introduction to the two phase system at the inner surface of the tube to the point of eruption from the two phase system at the interface between the froth and the gas core created at the center of the tube, defines the number of transfer units within the apparatus.

The uniformity of the transfer units may be controlled by maintaining a constant froth thickness throughout the length of the tube. A constant froth thickness may best be maintained when the porous tube is oriented horizontally, i.e., with its longitudinal axis perpendicular to the earth's gravitational field, so as to eliminate thinning of the film due to the effect of gravitational forces. With the tube in a horizontal orientation the earth's gravitational field has little net effect on a unit of liquid through a complete turn around the inner surface of the tube, since the unit of liquid is subjected to offsetting acceleration/deceleration during each turn. However, if the porous tube is oriented vertically, the effect of gravity on the liquid is cumulative throughout the full length of the tube, and thinning of the liquid film is inevitable.

The radial velocity of the bubbles moving through the two phase system is a combination of the initial velocity of the gas as it passes through the wall of the porous tube and enters the two phase froth and the velocity attributable to the radial movement of the bubbles through the centrifugal (radial) force field. Since friction and loss of kinetic energy reduce the radial velocity of the liquid as it moves longitudinally down the tube, the magnitude of the centrifugal force field, and thus the radial velocity of the bubbles attributable to the effect of the force field, change through the length of the tube. Uniformity may be maintained by controlling the other radial velocity component, i.e., the initial velocity of the entering gas. Variations in the initial velocity along the length of the tube can be achieved by dividing the plenum into longitudinal segments and adjusting the volume of gas throughput in each segment. The rate of gas penetration, or throughput, in each segment is, in turn, controlled by maintaining a specific pressure differential between the plenum segment and the gas core at the center of the tube.

The operating parameters of the method of the invention are selected with the object of optimizing the overall efficiency of mass transfer and thus the overall operating efficiency of the apparatus. Liquid is introduced to the apparatus at substantially higher flow rates relative to tube diameter than are used in methods and apparatus for separation of particles from an aqueous slurry, and the overall ratio of the volumetric flow rates of gas to liquid in each pass through the apparatus can be substantially higher than both the ratio used for particle separation and any ratio previously used or suggested for any purpose. The flow rate of liquid is determined interactively with the design of the processing apparatus so as to produce centrifugal force fields with radial accelerations of up to about 1500 G (where G is the standard gravitational acceleration), compared to accelerations of about 70 G used for particle separation. The overall ratio of gas flow rate to liquid flow rate utilized in the method of the invention may be as high as 50 to 1, compared to ratios of less than 5 to 1 used for particle separation.

The controllable operating parameters of the method of the invention may be selectively adjusted to produce conditions in the apparatus that encourage optimal material transfer between liquid and gas in each transfer unit, and maximize overall operating efficiency, for any chosen material transfer operation. In general, the method of the invention, performed in the apparatus of the invention, minimizes the dimension of gas bubbles produced in the apparatus (thereby maximizing the ratio of gas-liquid interfacial area relative to volume), dynamically mixes gas bubbles with liquid (thereby rapidly replenishing the supply of molecules of the transferring component in immediate proximity to the gas-liquid interface and minimizing mass diffusion limitations on transfer rate), optimizes the contact time between bubbles and liquid (thereby allowing material transfer to reach or closely approach equilibrium), and cleanly separates post-contact gas and liquid streams (thereby minimizing regressive transfer).

The method and the apparatus of the invention, as well as the features and advantages associated therewith, will be described in more detail with reference to the accompanying drawing figures.

DETAILED DESCRIPTION OF THE PREFERRED AND ALTERNATIVE EMBODIMENTS

Figure 1:
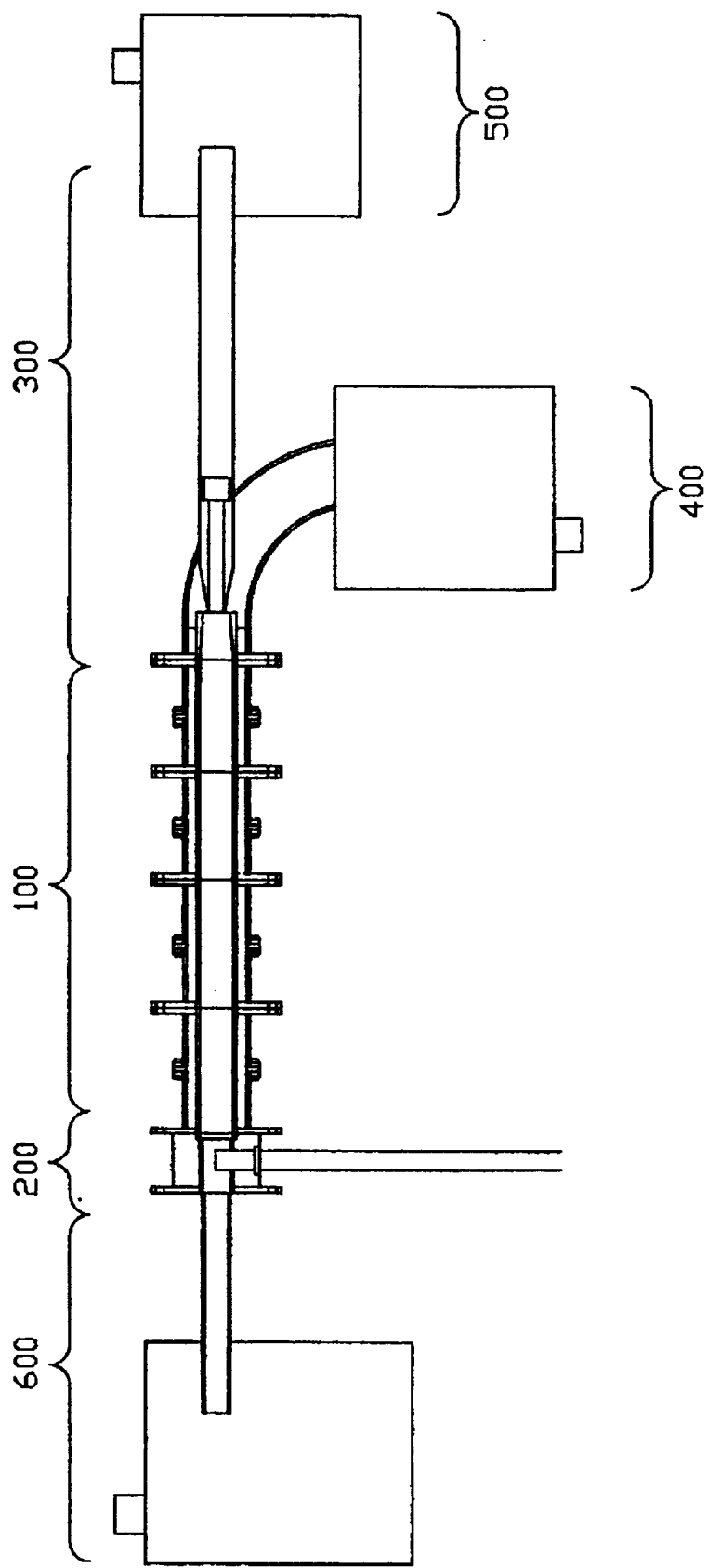
FIG. 1 is a schematic illustration of the preferred embodiment of the apparatus of the invention, identifying the major assemblies.

Referring to the drawing figures, and initially to the schematic illustration of FIG. 1, the apparatus of the invention generally comprises a gas-liquid contactor assembly 100, a liquid feed assembly 200, a gas-liquid separator assembly 300, a liquid collection assembly 400, and a gas discharge assembly 500. In the preferred embodiment the apparatus also comprises a second gas discharge assembly 600. The apparatus of the invention will be described in detail, with general reference to the method, and details of the method of the invention will then be described in the context of the apparatus.

Gas-liquid contactor assembly 100 of the preferred embodiment of the invention includes a cylindrical tube 101, with a first end 102 and a second end 103, disposed with the longitudinal axis of tube 101 in a generally horizontal orientation relative to the earth's gravitational field. Tube 101 is formed with a continuous porous wall 104, having an outer surface 105 and an inner surface 106, surrounding a hollow interior chamber 107. Tube 101 is surrounded by a nonporous outer jacket 108, preferably of cylindrical configuration and disposed concentric with tube 101, that encloses the porous wall 104 and forms an annular plenum 109 for gas. Gas is introduced to plenum 109 through gas inlet port or ports 110, which penetrate jacket 108.

Figure 5:
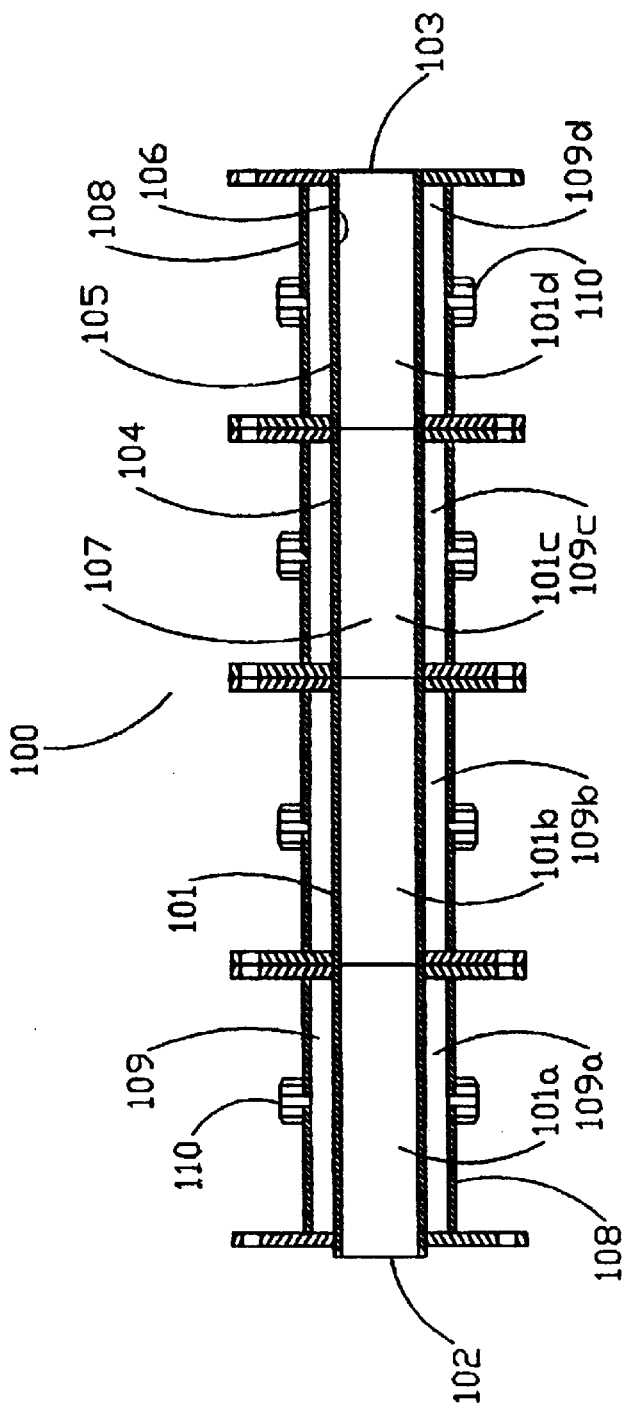
FIG. 5 is a sectioned side elevation view of the preferred embodiment of the gas-liquid contactor assembly of the apparatus.

It is preferred that plenum 109 be divided into segments or sections, to allow precise control of gas pressure along the length of tube 101 so as to provide a gas flow of uniform velocity through tube 101 throughout its length. In the preferred embodiment, shown in FIGS. 2, 3, and 5, both tube 101 and plenum 109 are divided into discrete segments and formed as independent canisters such as 101a/109a, 101b/109b, 101c/109c, and 101d/109d, to be longitudinally connected to form the overall tube 101 and plenum 109. The canisters are designed to be bolted together, or connected by other convenient means, so that they can be readily and quickly disassembled and reassembled for maintenance or whenever it may be desired to change the characteristics of one or more sections of tube 101. It is important that the sections of tube 101 be smoothly mated, so that the transition between sections along the inner surface of tube 101 is smooth and regular, and interruptions or perturbations in the flow of liquid along that inner surface are avoided.

Figure 6:
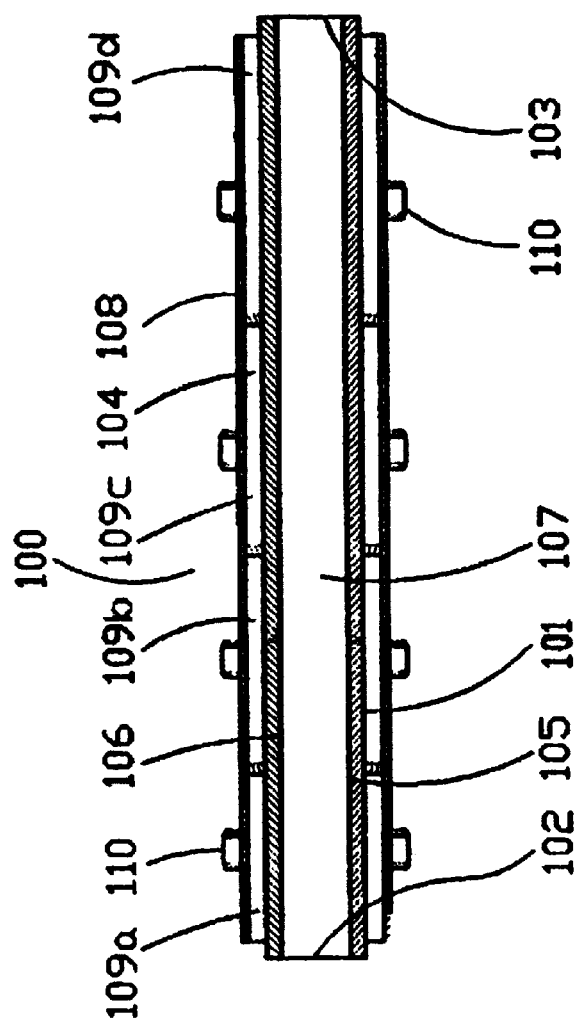
FIG. 6 is a sectioned side elevation view of an alternative embodiment of the gas-liquid contactor assembly of the apparatus, with a unitary tube and a sectioned plenum.
Figure 7:
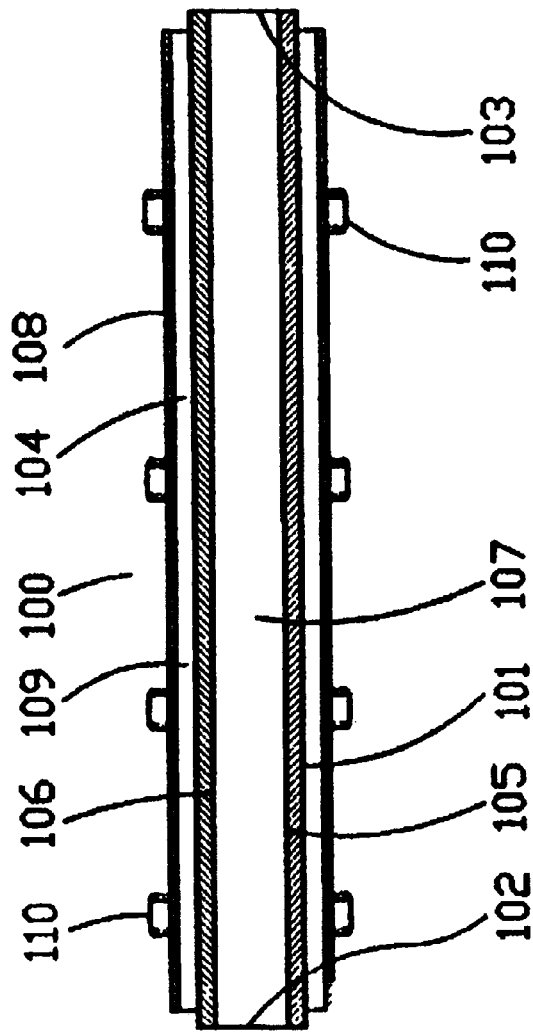
FIG. 7 is a sectioned side elevation view of an alternative embodiment of the gas-liquid contactor assembly of the apparatus, with a unitary tube and a single plenum chamber.
Figure 8:
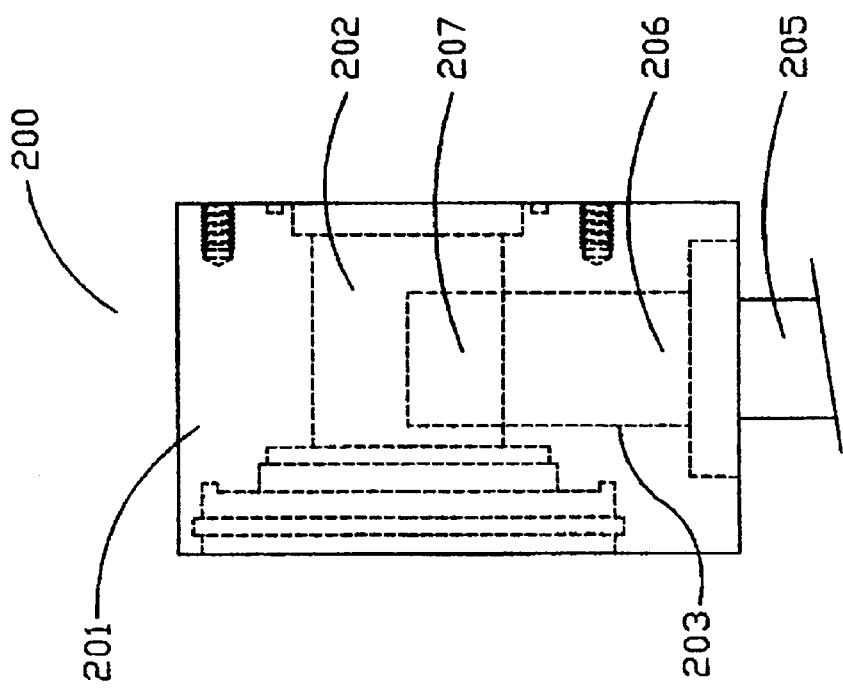
FIG. 8 is a view of the preferred embodiment of the liquid feed assembly of the apparatus, from the side of the apparatus.
Figure 9:
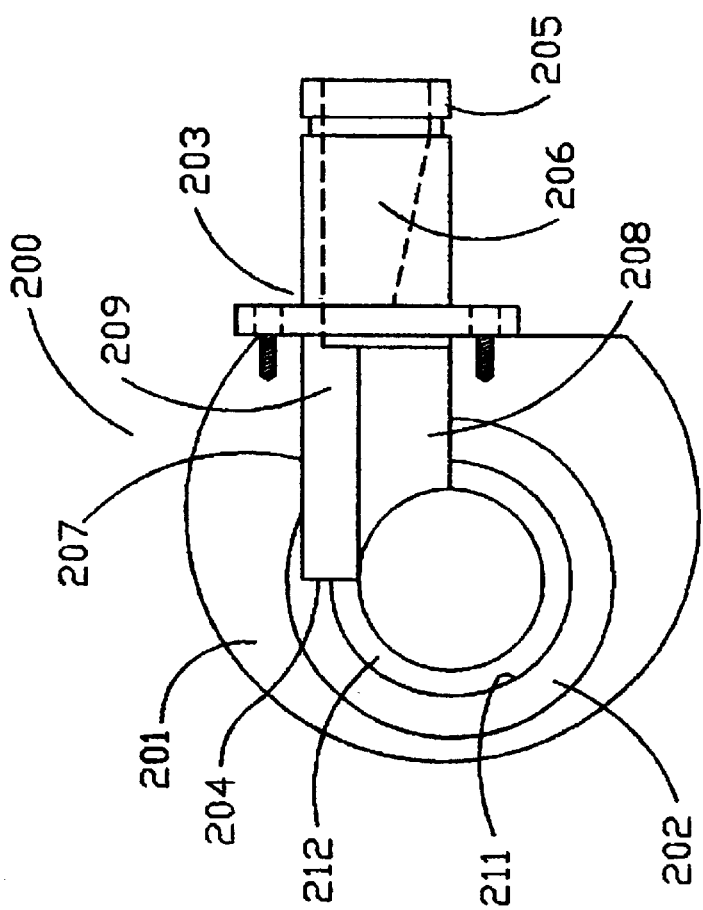
FIG. 9 is a view of the preferred embodiment of the liquid feed assembly of the apparatus, from the second end of the apparatus.
Figure 11:
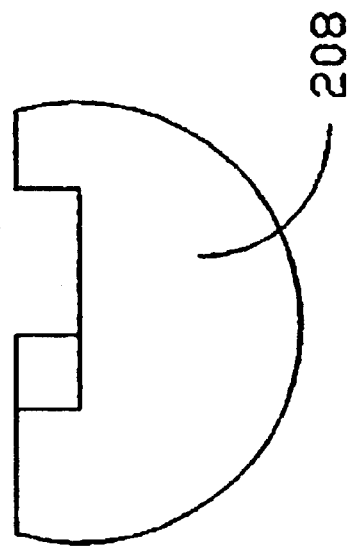
FIG. 11 is an end view of the preferred embodiment of the trough portion of the nozzle of the liquid feed assembly of the apparatus.
Figure 10:
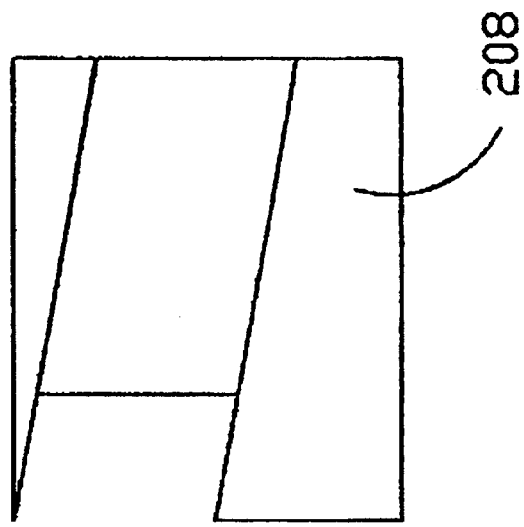
FIG. 10 is a top plan view of the preferred embodiment of the trough portion of the nozzle of the liquid feed assembly of the apparatus.
Figure 12:
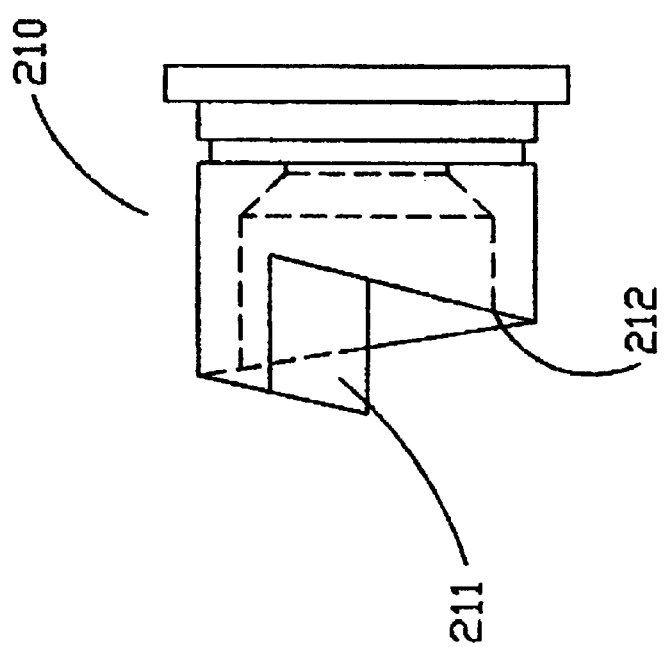
FIG. 12 is a side view of the preferred embodiment of the flow definer of the liquid feed assembly of the apparatus.

It is desirable for effective operation of the apparatus that a uniform gas pressure be maintained throughout a plenum section, and a plurality of gas inlet ports may be provided in each section to ensure a sufficient flow of gas at the uniform selected pressure. It is preferred that a gas dispersion device may be utilized to ensure uniform gas distribution and pressure in each plenum section and to prevent direct impingement of incoming gas against the outer surface of tube 101. If tube 101 is not divided into sections, plenum 109 still may be divided into segments or sections, as shown in FIG. 6, to form independent plenum sections such as 109a, 109b, 109c, and 109d, to increase control of the gas distribution along the length of tube 101. However, division of tube 101 and plenum 109 is not essential to the invention, and an embodiment with a continuous tube 101 and a single plenum, illustrated in FIG. 7, may be utilized, especially if the length of those components is relatively short.

The porous wall 104 of tube 101 is penetrated by a multiplicity of microscopic pores so as to allow the passage of pressurized gas from plenum 109 to interior chamber 107 through the porous wall while preventing the passage of liquid through the wall. The pores may range in dimension from about 0.5 micron to about 40 microns, with a preferred range of about 0.5 micron to about 10 microns. For effective and efficient performance of the method of the invention, the distribution of pores throughout wall 104 should be uniform, to ensure a uniform and consistent flow of gas from the inner surface of wall 104. The preferred material of construction for tube 101 is sintered stainless steel, though other suitable materials, such as higher alloy steels, pure metals, non-ferrous alloys, ceramics, or plastics (for some applications) may be used. Porous media produced by other methods of manufacture, such as woven wire mesh, may also be used.

In general, any porous media, regardless of material or manufacturing approach, may be used, so long as the media is capable of suitable performance under the conditions to which it will be exposed.

Liquid feed assembly 200, shown in FIGS. 8 through 12, is connected to gas-liquid contactor assembly 100 at the first end of tube 101, and serves to feed incoming liquid into chamber 107 in a swirl or spiral flow pattern along inner surface 106 of porous wall 104. Liquid is fed to chamber 107 tangentially to the longitudinal axis of tube 101 and at sufficient velocity to form a thin liquid film that travels around the inner surface of porous wall 104 in a swirl or spiral pattern from first end 102 to second end 103 of tube 101. The primary components of liquid feed assembly 200 include mounting body 201, extension tube 202, and feed head 203. Mounting body 201 is connected to the end of jacket 108 associated with the first end of tube 101 in liquid tight and gas tight relation. Extension tube 202 comprises a cylindrical body, preferably open at both ends, of the same cross-sectional dimension and configuration as tube 101. Extension tube 202 is disposed in mounting body 201 such that extension tube 202 is coaxially aligned and mated at its second end with the first end of tube 101 when mounting body 201 is connected to jacket 108. In the preferred embodiment of the apparatus the first end of extension tube 202 extends through mounting body 201 and is open to allow the flow of gas through extension tube 202 from interior chamber 107 of tube 101. In an alternative embodiment, the first end of extension tube 202 is closed within mounting body 201 and all gas entering interior chamber 107 exits through the second end of tube 101. As noted above, the transition between extension tube 202 and tube 101 should be very smooth and regular to avoid interference with the liquid flow pattern. Extension tube 202 is formed with a nonporous wall and is not in direct communication with plenum 109. Extension tube 202 is penetrated by an aperture 204 through which liquid is received from feed head 203.

Feed head 203 includes an inlet nipple 205 of generally cylindrical configuration, to be connected to conventional piping (not shown in the drawing figures) to receive a flowing stream of liquid, an acceleration chamber 206 connected to the inlet nipple, and slotted nozzle 207 connected to acceleration chamber 206 and received within aperture 204. Acceleration chamber 206 is of the same dimension and configuration as inlet nipple 205 at one end, for connection to the inlet nipple, and narrows in dimension toward its opposite end, which is connected to nozzle 207. The outlet of nozzle 207 is mated with aperture 204 so that liquid flowing through nozzle 207 enters extension tube 202 tangential to the curvature of its inner surface. In the preferred embodiment, the narrowing of acceleration chamber 206 is linear, so that the cross-sectional area of the chamber is smoothly reduced from inlet nipple 205 to nozzle 207. As liquid is pumped through acceleration chamber 206 at a constant volumetric flow rate the velocity of the liquid entering nozzle 207 is increased in proportion to the decreasing cross-sectional area of the acceleration chamber, and enters extension tube 202 at a high tangential velocity. In the preferred embodiment of the apparatus, nozzle 207 is formed as a two piece construction, with an open "trough" portion 208 and a closure portion 209 facially mated with portion 208 and overlying the trough in portion 208 to constrict and define the liquid flow into the desired ribbon pattern as the liquid exists nozzle 207.

Aperture 204 and nozzle 207 are disposed relative to extension tube 202 such that the flow path, or flow vector, followed by liquid entering the extension tube deviates at a slight angle from perpendicular to the aligned longitudinal axes of the extension tube and tube 101, dividing the velocity vector of the incoming liquid flow into a radial component and a longitudinal component, and causing the liquid to assume a spiral flow path toward second end 103 of tube 101 as it travels around the inner surfaces of extension tube 202 and porous wall 104.

Liquid feed assembly 200 also includes a flow definer 210 disposed in feed head 203 in coaxial alignment with tube extension 202 and tube 101, and open through its center to provide a flow path for outflowing gas. Flow definer 210 includes a helical ramp section 211 that extends at the desired vector angle through a portion of one turn within extension tube 202 to guide the liquid exiting from nozzle 207 and assure the integrity and regularity of the desired flow path. The "upstream" edge of ramp section 211 is provided with ledge 212 which extends above the upper surface of the liquid stream flowing along the ramp section to prevent spreading of the liquid "ribbon" and to prevent any entrainment of liquid in the stream of gas flowing outwardly through feed assembly 200 in the preferred embodiment.

With tube 101 disposed in a horizontal orientation the progression of liquid flow along the length of the tube is not directly affected by the action of gravity, and it will be understood that the number of "turns" followed by the liquid as it travels through a tube 101 of given length may be controlled by adjustment of the angle of deviation of the incoming liquid flow from perpendicular to the longitudinal axis of the tube. The number of turns followed by the liquid may also be controlled by adjustment of the length of tube 101. The width of nozzle 207 also affects the number of turns followed by the liquid to some degree, since the width of the nozzle affects the width of the ribbon of liquid spiraling along the inner surface of tube 101.

The spiraling liquid loses kinetic energy as it moves through tube 101, and there is a practical limit to the number of turns that can be achieved in an effective operational context. Up to about 50 turns can be realistically achieved, and a number of turns between about 10 and about 40 is within the range of practical feasibility. The only lower limit on the number of turns is the constraint imposed within the context of the method for achieving and maintaining appropriate gas-liquid contact for the desired result.

Two generally discrete material phases exist within the gas-liquid contactor assembly; a gas phase occupying the center of interior chamber 107, and a froth film (mixed liquid and gas in two phase flow) traveling in a spiral path along the inner surface of porous wall 104. While gas is introduced to the liquid through porous wall 104 a froth is formed by combination of the liquid and a multitude of gas bubbles mixed with and moving through the liquid toward the center of interior chamber 107, as well as moving with the liquid in the spiral path. The radial movement of the gas bubbles toward the center of interior chamber 107 is rapid compared to the longitudinal movement of the froth toward the second end of tube 101, and the volume of gas injected from porous wall 104 at any point along that wall exits the two phase froth to the center of interior chamber 107 within a relatively short longitudinal distance. The mechanics of the spiral flow of the two phase froth, discussed in more detail in the context of the method of the invention, cause a clean separation between gas and liquid in the central portion of interior chamber 107, so that a well defined column of gas is always present within the central portion of that chamber. The liquid and the gas column at the center of interior chamber 107 are divided at the second end of tube 101 into discrete streams in gas-liquid separator assembly 300.

Precise separation between the gas column or stream and the spiraling liquid stream is a significant factor to the efficiency and effectiveness of the mass transfer operation, because remixing of gas with liquid can result in a reverse transfer of the designated component. Although the gas at the center of interior chamber 107 and the liquid (as a component the two phase froth) are in direct contact at the interface between the central gas column and the annular froth in interior chamber 107 of tube 101, the physical dynamics of the system effectively eliminate the possibility of remixing. The area of interfacial contact between the gas at the center of interior chamber 107 and the liquid in the two phase froth along the inner surface of porous wall 104, across which mass transport might occur, is insignificant in comparison to the area of interfacial contact between the gas bubbles moving through the liquid to the center of the chamber. In addition, the spiral flow of the two phase froth creates a centrifugal force field of sufficient magnitude to prevent liquid from moving into the central portion of interior chamber 107 while allowing the flow of gas into that portion. Physical separation between gas and liquid is performed while these limitations to remixing exist, in separator assembly 300.

Figure 13:
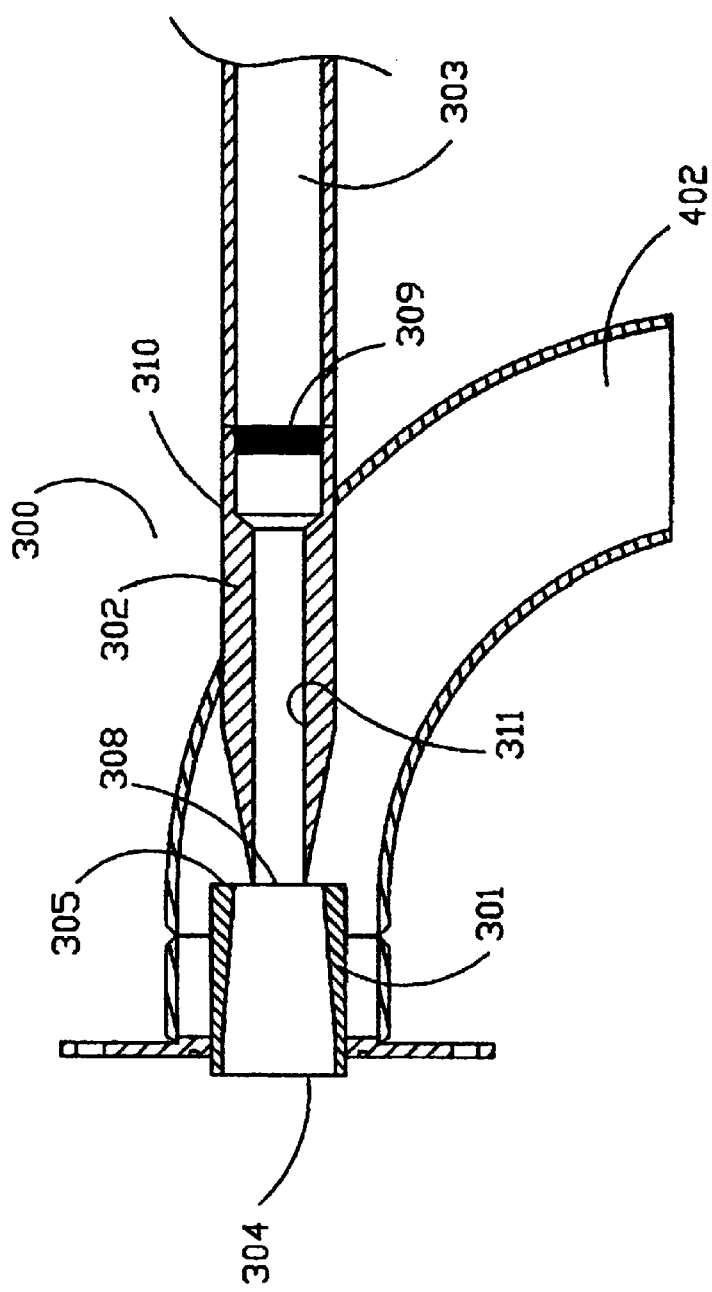
FIG. 13 is a sectioned side elevation view of the preferred embodiment of the gas-liquid separator assembly of the apparatus, showing the preferred embodiment of the degassing tube.

In the preferred embodiment of the apparatus, gas-liquid separator assembly 300 includes degassing tube 301, gas exit port 302, and gas duct 303, shown in enlarged detail in FIG. 13. Degassing tube 301 is a generally cylindrical tube with a first end 304 and a second end 305. Degassing tube 301 is disposed in coaxial alignment with tube 101 with its first end 304 mated to second end 103 of tube 101 so as to provide an uninterrupted flow path from tube 101 to, and through, degassing tube 301 for both liquid and gas. The wall of degassing tube 301 is nonporous and is isolated from plenum 109, so there is no flow of gas into the liquid from the wall of tube 301. Since the flow of gas to the liquid from the tube wall ceases at the end of tube 101, the gas bubbles mixed with the liquid as it exits tube 101 move through and from the liquid during passage through degassing tube 301, and the gas and the liquid separate into two discrete phases by the time they reach the second end of tube 301. The first end 304 of degassing tube 301 is the same inside diameter as porous tube 101, and the diameter of degassing tube 301 preferably decreases toward second end 305, the liquid exit point. The decrease in diameter is such that the inside diameter of second end 305 is equal to the inside diameter of first end 304, less two times the thickness of the entering liquid film. The smaller second end of degassing tube 301 acts as a dam to prevent liquid film thinning, and degassing tube 301 also acts as an acceleration chamber to increase the radial velocity of bubbles moving to the central gas column or core. As the diameter of the degassing tube 301 decreases the centrifugal acceleration increases in accordance with the relationship $$a = v^2/r$$

where
  a=acceleration
  v=radial velocity
  r=radius

The additional centrifugal acceleration increases the velocity of bubbles through the two phase froth to the center of the tube such that at the second end of the degassing tube the gas has fully separated from the liquid, the two phase froth no longer exists, and there is a discrete boundary between the liquid and gas phases. Each phase occupies a definable portion of the volume of the interior of degassing tube 301; the liquid continuing to flow in an annular band around the inner surface of the tube, and the gas flowing in a cylindrical column through the center of the tube.

Gas outlet port 302 is a generally tubular body with a first end 308 and a second end 309, disposed in coaxial alignment with tubes 101 and 301. Gas outlet port 302 is defined by a continuous wall with an outer surface 310 and an inner surface 311. The inside cross-sectional area of gas outlet port 302 is preferably about ⅙ of the inside cross-sectional area of tube 101 and the first end of degassing tube 301. The thickness of the wall of gas outlet port 302 is uniform through a portion of its length from second end 309 toward first end 308, but preferably narrows in proximity to first end 308 with outer surface 310 converging toward inner surface 311 to form a knife edge at first end 308.

Gas outlet port 302 is disposed with its first end 308 aligned with or extending a short distance into the interior of degassing tube 301. The knife edge at the first end of the gas outlet port physically divides the part of the degassing tube into which it extends into an outer annular portion and an inner cylindrical portion. Since the thickness of the liquid film flowing around and along the inner surface of the separator tube may be precisely determined and controlled, the first end of gas outlet port 302 may be positioned so that its knife edge lies precisely at the gas-liquid interface and splits the gas and liquid streams at that interface. Further flow of liquid through degassing tube 301 occurs in a continuation of the spiral pattern through the annular space between the inner surface of the degassing tube and the outer surface of the gas outlet port, while the gas flows into and through the interior of gas outlet port 302 and into gas duct 303. Gas duct 303 is an elongate pipe or tube connected at one end to the second end of gas outlet port 302, and serves to convey the gas to first gas discharge assembly 500.

Figure 14:
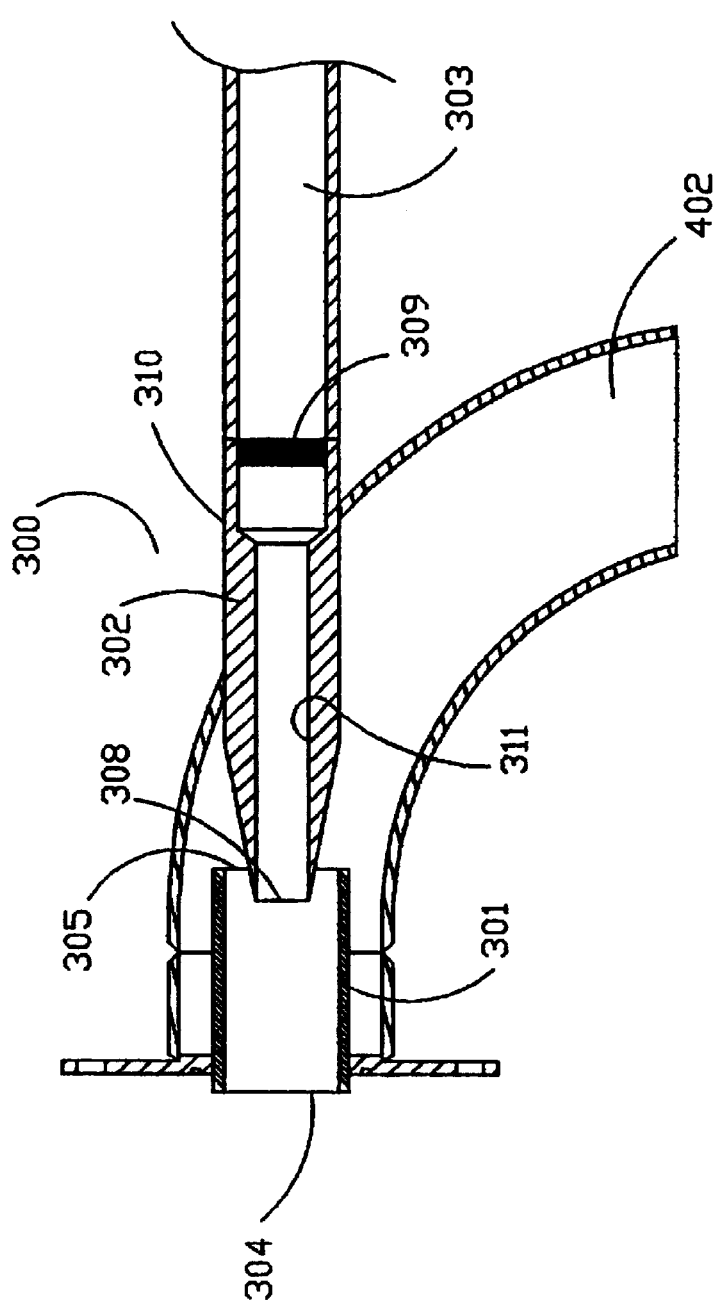
FIG. 14 is a sectioned side elevation view of an alternative embodiment of the gas-liquid separator assembly of the apparatus, showing a first alternative embodiment of the degassing tube.

In an alternative embodiment, shown in FIG. 14, degassing tube 301 may be of constant diameter through its length. A straight degassing tube may be effectively used when separation of gas and liquid will occur within the length of the degassing tube without the additional acceleration resulting from decreasing the diameter of the degassing tube. Degassing tube 301 may also be divided into a degassing section and a separator section, mated in coaxial alignment with the degassing tube as illustrated in FIG. 15, with first end 306 of the separator section connected to second end 305 of the degassing section, and with the first end 308 of the gas outlet duct aligned with or extending into second end 307 of the separator section.

Figure 15:
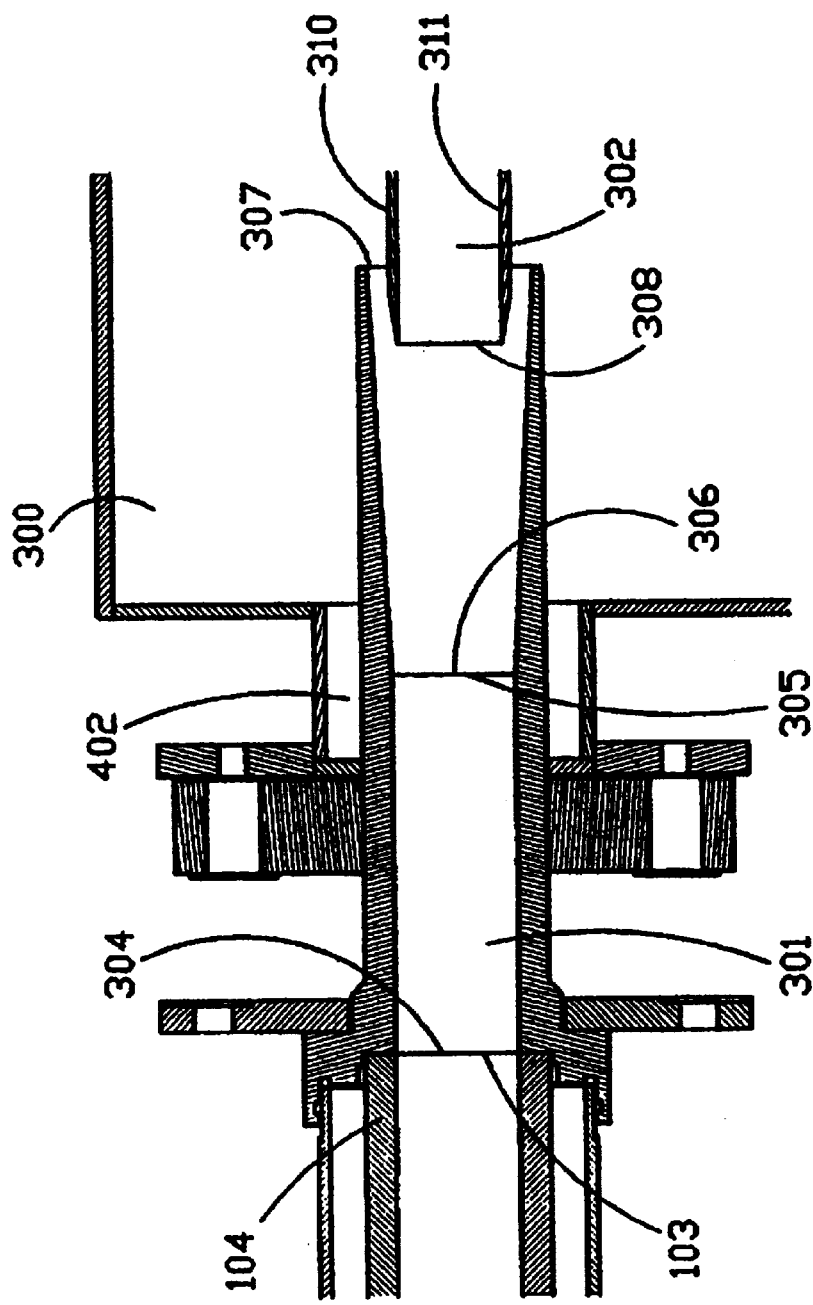
FIG. 15 is a sectioned side elevation view of another alternative embodiment of the gas-liquid separator assembly of the apparatus.
Figure 16:
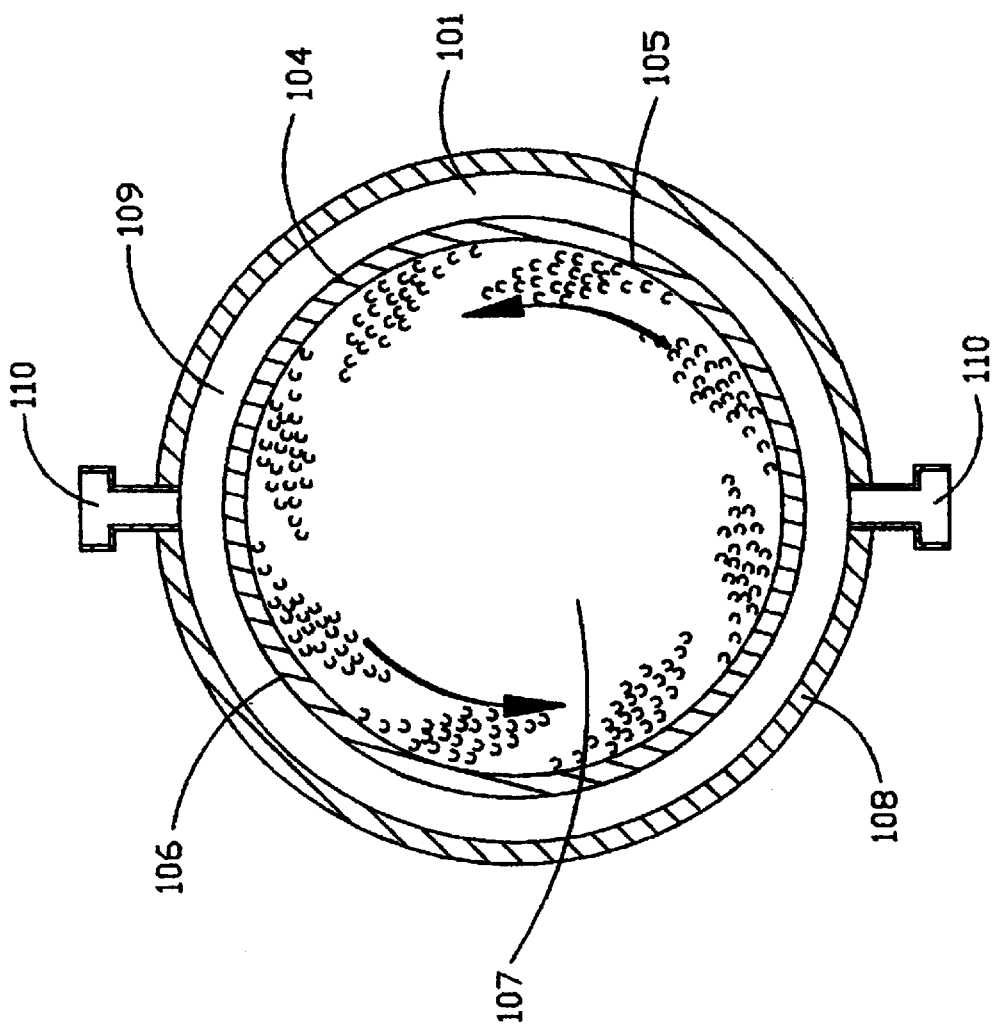
FIG. 16 is a cross-sectioned end view of the preferred embodiment of the gas-liquid contactor assembly of the apparatus, conceptually illustrating the two phase froth and indicating the swirl flow pattern through the apparatus.
Figure 17:
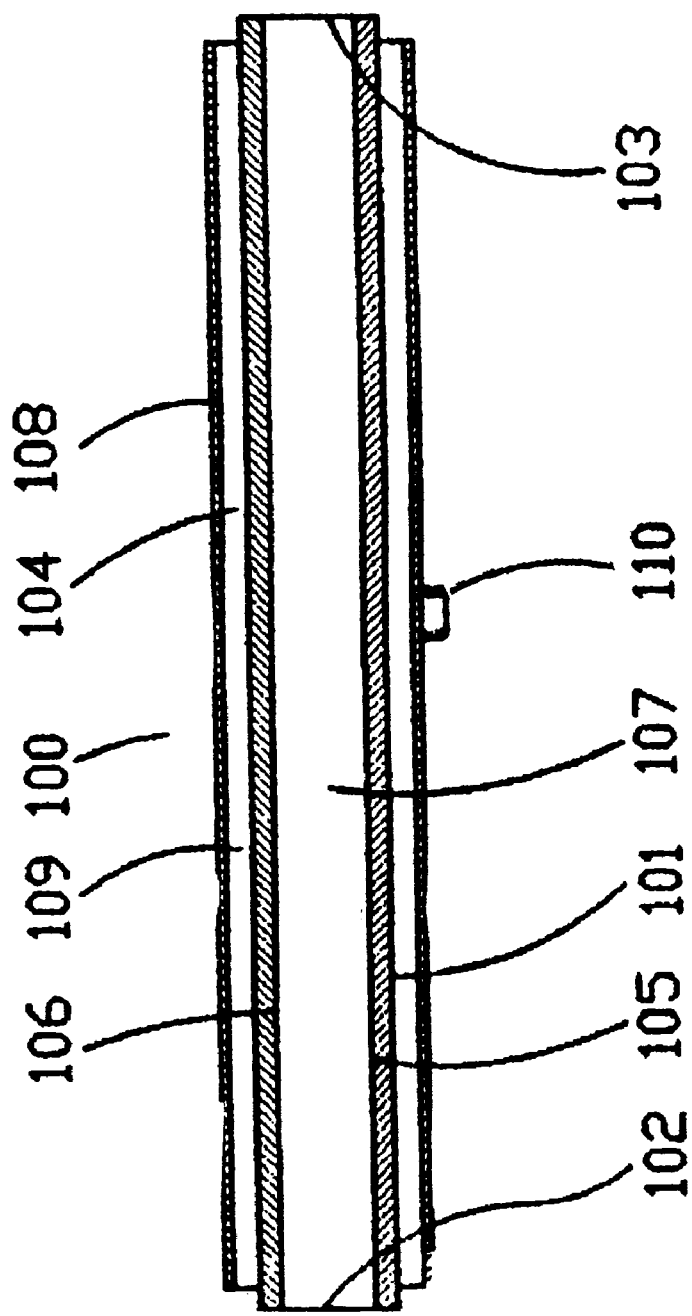
FIG. 17 is a sectioned side elevation view of an alternative embodiment of the gas-liquid contactor assembly of the apparatus, with a unitary tube, a single plenum chamber and a single inlet port.
Figure 18:
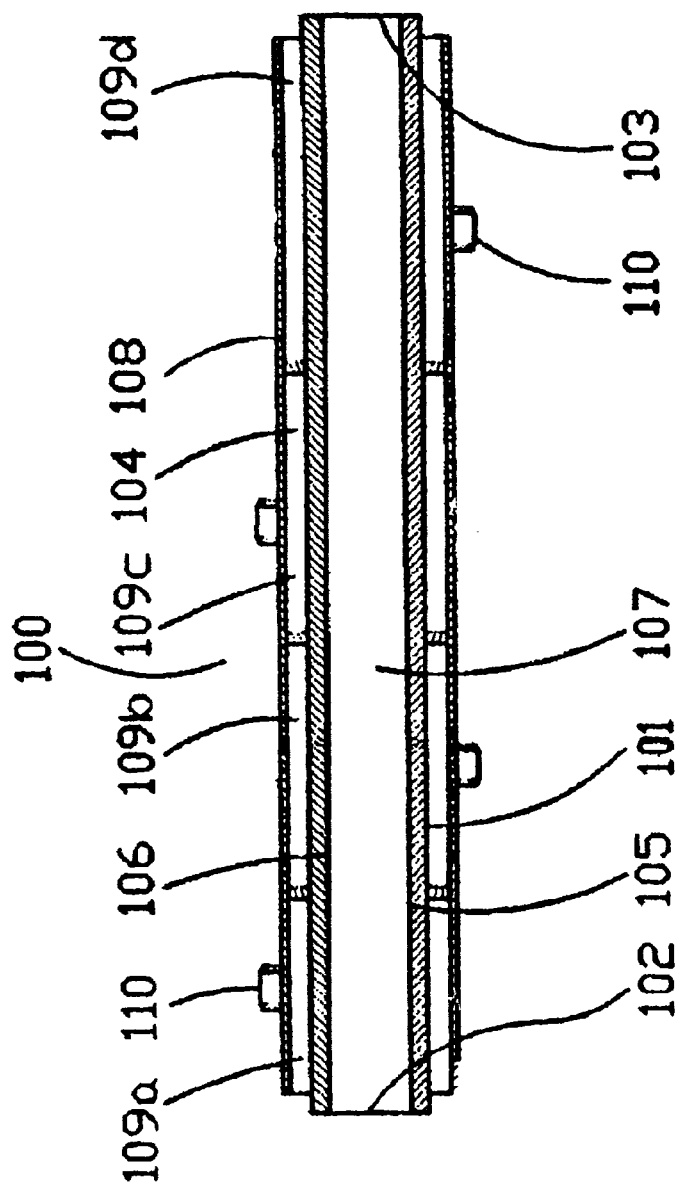
FIG. 18 is a sectioned side elevation view of an alternative embodiment of the gas-liquid contactor assembly of the apparatus, with a unitary tube, a sectioned plenum, and a single gas inlet port associated with each plenum.
Figure 19:
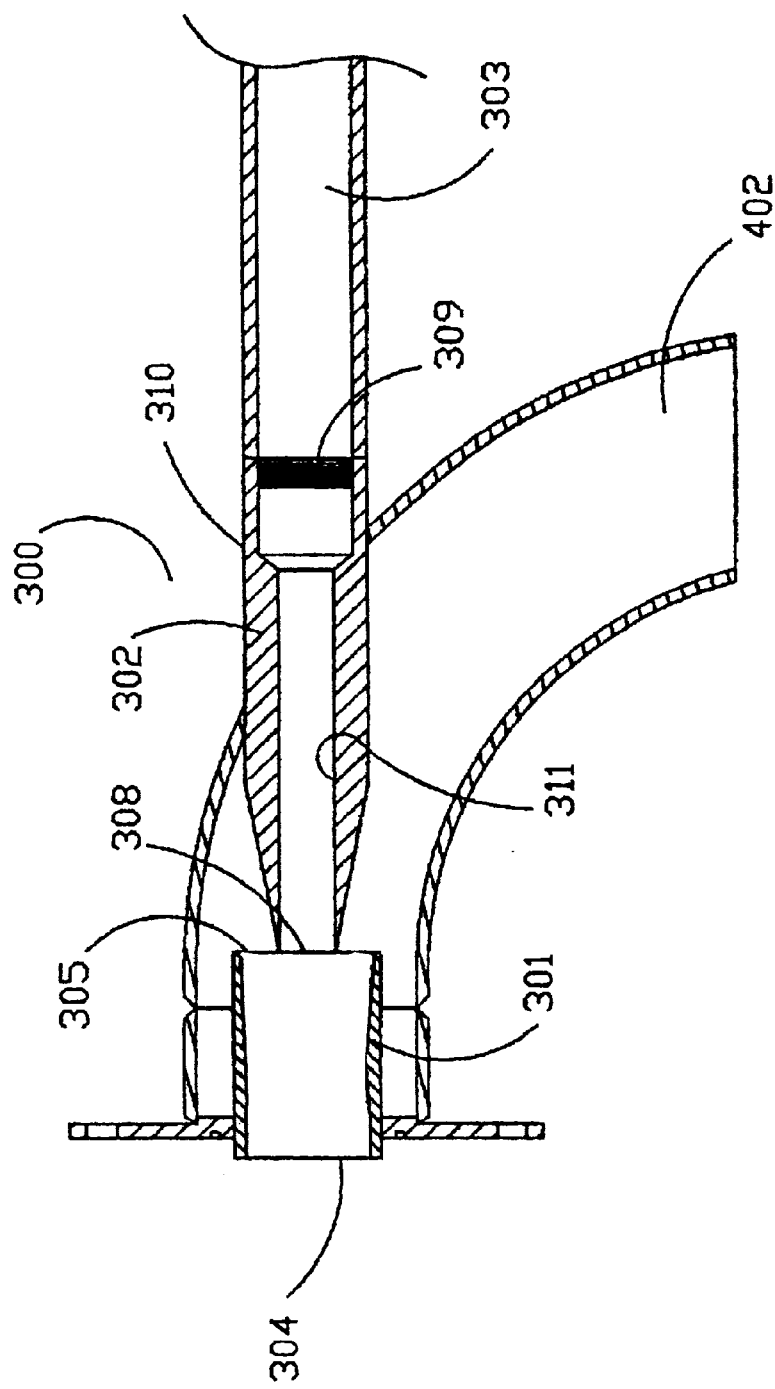
FIG. 19 is a sectioned side elevation view of an alternative embodiment of the gas-liquid separator assembly of the apparatus, showing a second alternative embodiment of the degassing tube.
Figure 20:
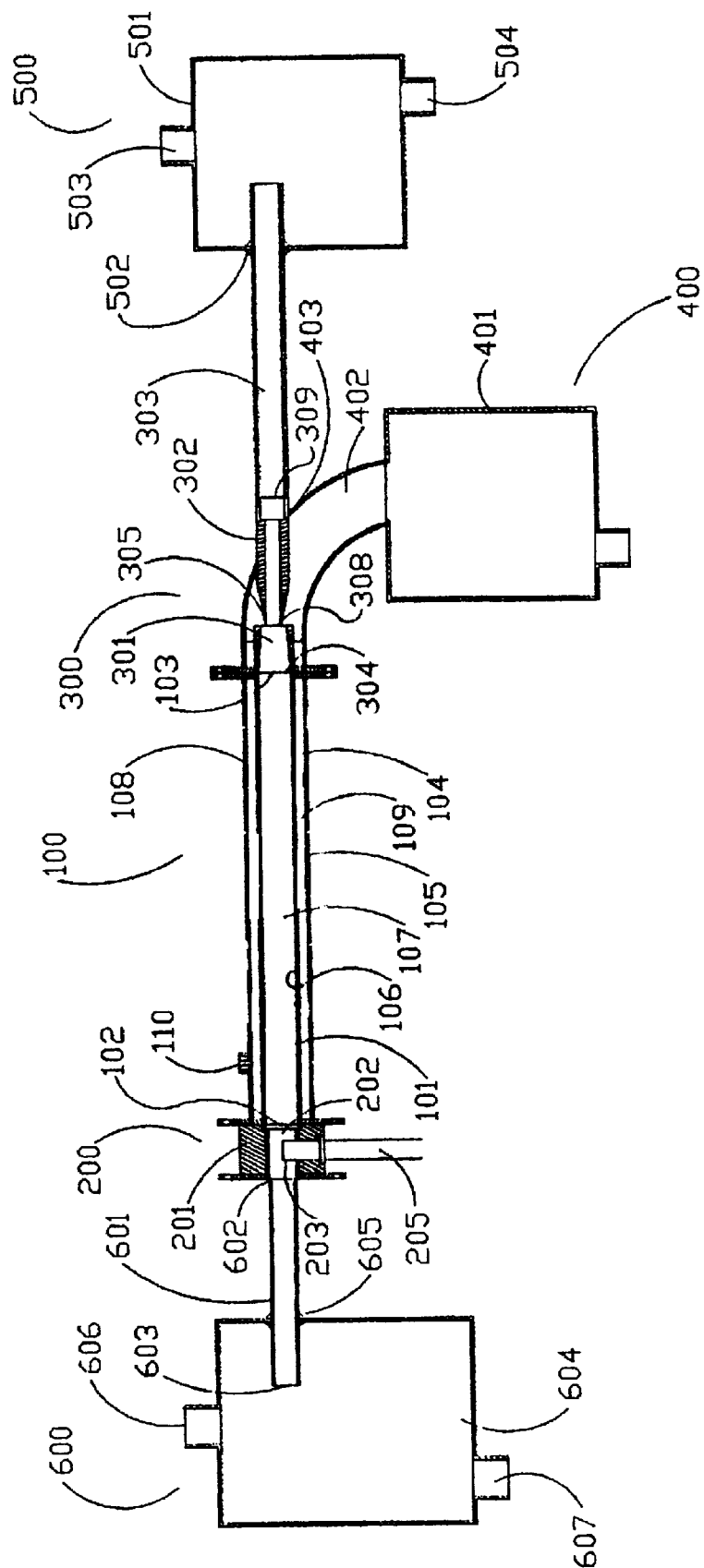
FIG. 20 is a sectioned side elevation view of an alternative embodiment of the apparatus of the invention.

In a second alternative embodiment, degassing tube 301 is constructed with an increasing diameter in the portion of the tube approaching its second end, as illustrated in FIG. 15. If the alternate discrete separator tube embodiment referred to above is employed, the increase in diameter occurs in that separator tube. In this alternative approach, the angle of convergence of the wall of gas outlet port 302 is approximately equal to the angle of divergence of the inner surface of the second end of degassing tube 301, or the separator tube component, if used. The position of gas outlet port 302, and gas duct 303 to which it is connected, may also be made longitudinally adjustable relative to the fixed position of degassing tube 301, with gas duct 303 supported by bearing units 312 and 313. As in the preferred embodiment, the knife edge at the first end of the gas outlet port physically divides the interior of the surrounding tube into an outer annular portion and an inner cylindrical portion. Adjustability of the position of the knife edge, along with the increasing inner diameter of the tube, allows the lateral dimension and thus the cross-sectional area of the annular portion to be controlled and adjusted. Since the thickness of the liquid film flowing around and along the inner surface of the tube may be precisely determined, the knife edge may be positioned precisely at the gas-liquid interface to split the gas and liquid phases at that interface. Although utilization of this alternative embodiment would provide some degree of additional operating control for the apparatus, it does increase the physical complexity of the apparatus and is not considered essential for effective operation.

The liquid exits the second end of degassing tube 301 into liquid collection assembly 400, which comprises a vessel 401 of substantially greater internal volume than the combined volumes of tubes 101 and 301. In the preferred embodiment as illustrated, the degassing tube extends into the first end of liquid receiver 402, which receives outflowing liquid and conveys it to vessel 401. Gas outlet port 301 extends through aperture 403 in the wall of liquid receiver 402 and is sealed therein against the escape of liquid from the liquid receiver before it reaches vessel 401. Liquid in vessel 401 may be withdrawn, through outlet pipe 404, continuously or in batches, as desired.

The gas flowing through gas duct 303 is collected in gas discharge assembly 500, which, in the preferred embodiment, comprises a hollow vessel 501 into which the second end of the gas duct extends. Gas duct 303 extends into vessel 501 through aperture 502, and is sealed therein to prevent the escape of gas from the vessel. The gas is withdrawn from vessel 501 through discharge pipe 503. In addition to containing the discharged gas, vessel 501 also serves a demisting function, and allows any condensed vapor carried from gas duct 303 to fall to the bottom of the vessel, from which it may be removed through outlet pipe 504.

In the preferred embodiment of the apparatus, gas flowing from the first end of tube 101 is collected in second gas discharge assembly 600. Second gas discharge assembly 600 comprises a second gas duct 601, with a first end 602 and a second end 603, and a hollow vessel 604. Second gas duct 601 is a hollow cylindrical tube connected to feed head 203 in coaxial alignment with extension tube 202 with its first end 602 extending into the gas passageway through feed head 203. Second gas duct 601 extends into vessel 604 through port 605, which forms a seal against the outer surface of the duct. The gas is withdrawn from vessel 604 through discharge pipe 606. Like vessel 501, vessel 604 also provides a demisting function, and includes liquid outlet pipe 607. It will be understood that the functions of vessel 501 and vessel 604 may be combined in a single gas collection vessel. Other alternative embodiments for gas collection and transport may also be utilized, so long as the described purposes and functions are achieved.

In the preferred embodiment of the apparatus the inside cross-sectional area of first end 602 of second gas duct 601 is 1/6 the inside cross-sectional area of tube 101. In more general terms for the preferred embodiment, the cross-sectional area of second gas duct 601 and the inside cross-sectional area of gas outlet port 302 are equal, and the total of those areas is equal to the area of the interior of tube 101 that is occupied by the central gas column. In the alternative embodiment in which the inside diameter of the degassing tube (or separator tube) is increased near its second end, the inside diameter of gas outlet port 302 may be about 80% of the inside diameter of tube 101. In any event, the total cross-sectional area of the gas duct or ducts should not be less than the cross-sectional area occupied by the column of gas in the central portion of tube 101.

Figure 4:
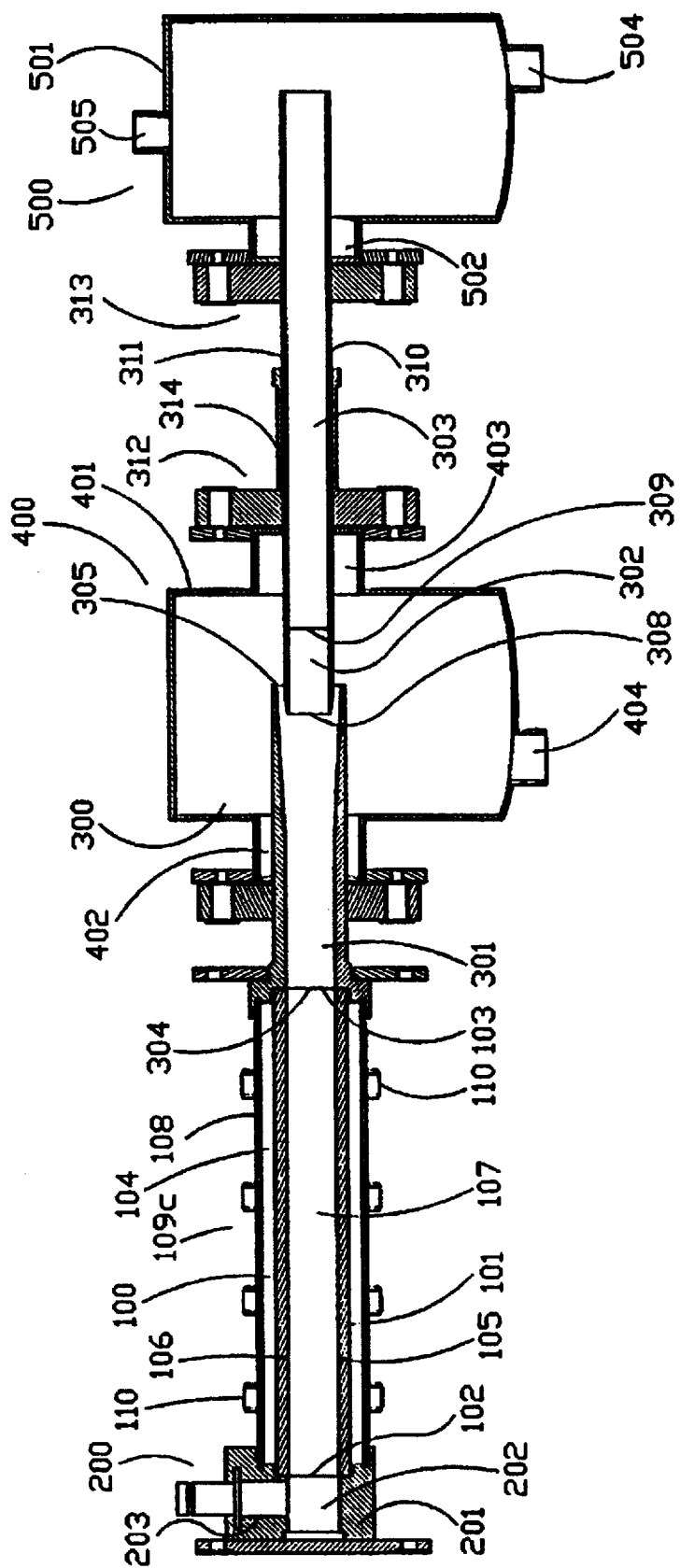
FIG. 4 is a sectioned side elevation view of an alternative embodiment of the apparatus of the invention.

Although the bi-current flow of gas established in the preferred embodiment of the apparatus provides more effective and efficient operation, reasonable results can be achieved with an alternative embodiment in which gas is removed from the apparatus only at the second end of tube 101, in co-current flow with the liquid. Another alternative embodiment, in which gas is removed only at the first end of tube 101, in counter-current flow, may also be used. In the alternative embodiment in which gas is removed only from the second end, the first end of extension tube 202 is closed and gas discharge assembly 600 is entirely omitted. This alternative embodiment of the apparatus is shown in FIG. 4.

If the flow of the liquid stream or of either gas stream into and through the respective outlets is restricted or a back-pressure condition is allowed to develop and exist in any of the vessels, the smooth flow of liquid and gas from the interior of tube 101 will be disturbed and operating conditions will be disrupted, with severely detrimental effects on performance. If excess pressure exists in the liquid outlet flow path a "pressure dam" is created and liquid will "back up" in the degassing tube. The backup of liquid increases the thickness of the annular film and forces liquid toward the center of degassing tube 301 and porous tube 101, whereupon liquid is drawn into both gas ducts and into the gas receiving vessels. With liquid flowing through the gas ducts the flow of gas through those ducts is restricted, and gas pressure within the apparatus increases. The increase in liquid film thickness and the increase in pressure in the interior of tube 101 upsets the dynamics between the froth phase and the central gas column within the tube, disrupting the creation of a smooth division between froth and free gas, and the froth phase can expand into the central portion of the tube. As the thickness of the froth phase expands, froth may be drawn into the gas ducts, further disrupting operations.

Any flow of liquid into and through the gas ducts reduces the flow of liquid through the liquid outlet and reduces the "pressure dam" in the liquid flow path. As the back pressure reduces, the thickness of the liquid film layer in the degassing tube is reduced sufficiently for the liquid flow to return to the designed flow path temporarily. However, as the pressure restriction to liquid flow through the desired path increases again the upset condition is repeated. Unless controlled, this cycle may occur repeatedly, resulting in a "surging" pattern of operation. In addition, if the pressure in the liquid receiving vessel drops below the desired pressure for steady operation from the over-pressure condition, gas may be drawn with the liquid exiting the degassing tube and enter the liquid vessel, exacerbating the pressure swings and the corresponding flow surges.

Figure 2:
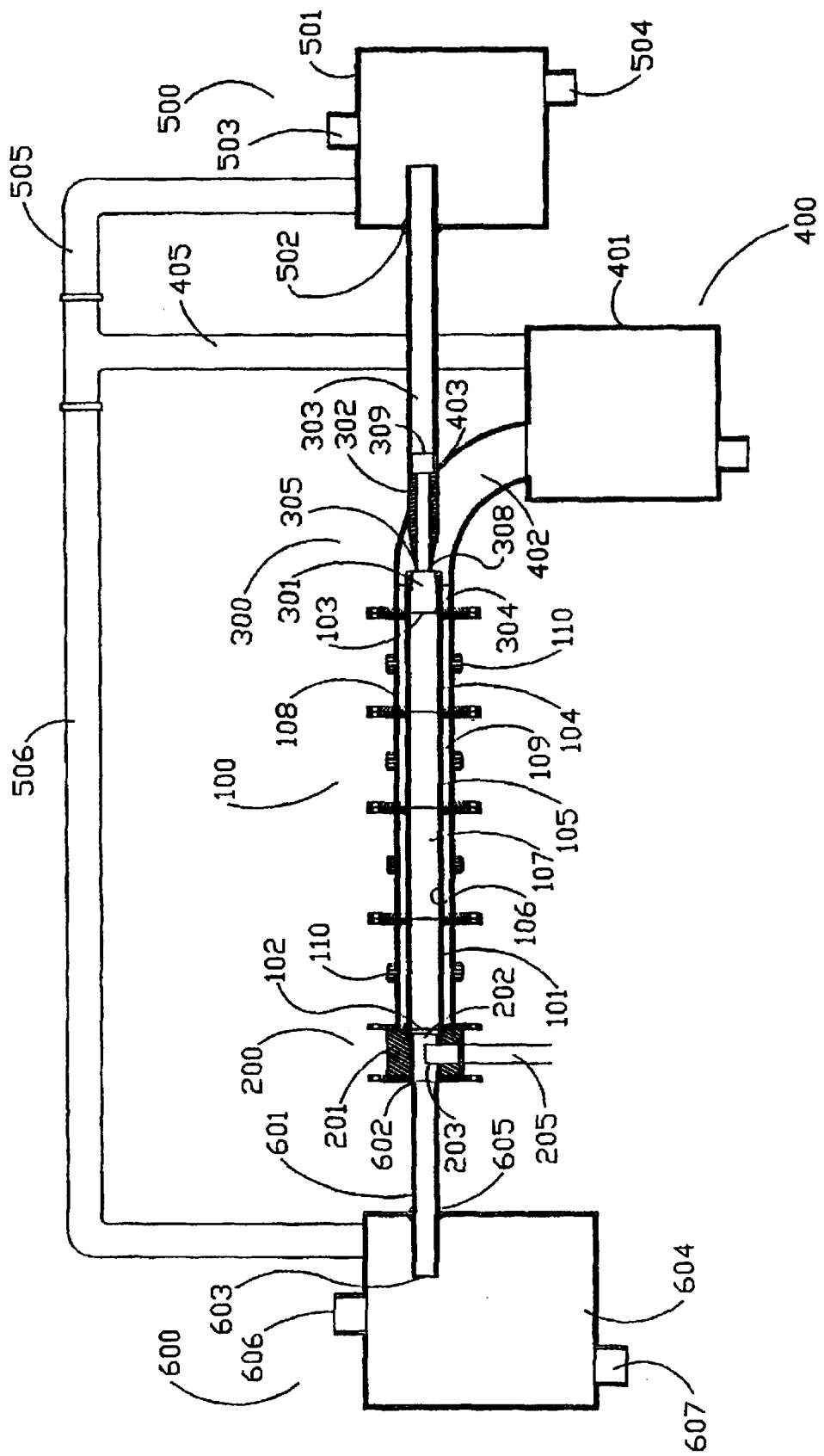
FIG. 2 is a sectioned side elevation view of the preferred embodiment of the apparatus of the invention.
Figure 3:
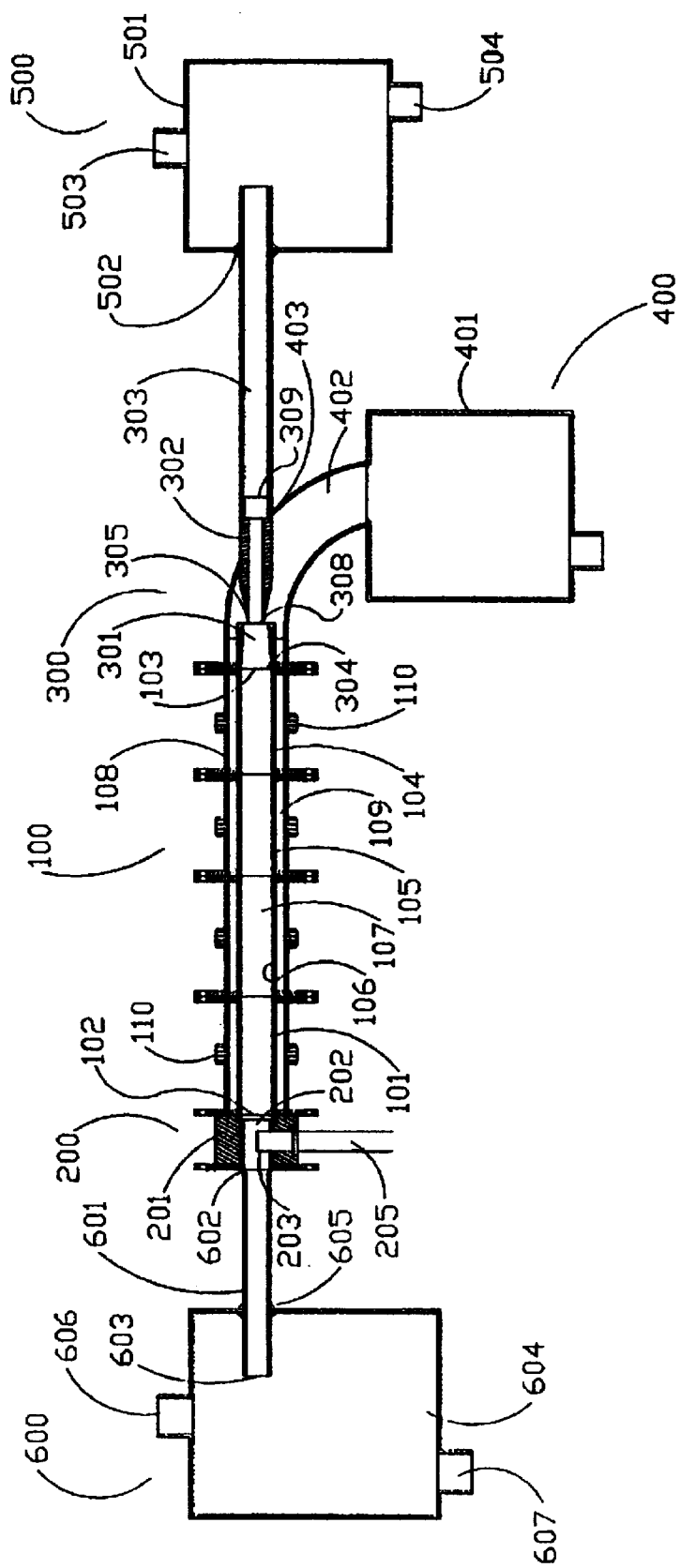
FIG. 3 is a sectioned side elevation view of the apparatus of the invention, without pressure equalizing vent lines.

In order to prevent the development of flow surges and maintain steady operation, the preferred embodiment of the apparatus provides a means of controlling and equalizing pressures between the interior of tubes 101 and 301 and the gas and liquid vessels, illustrated in FIG. 2. Liquid vessel 401 is provided with vent 405 to release and relieve any excess pressure in vessel 401. Gas vessels 501 and 604 are connected by pressure equalizing vent lines 505 and 506, which are mutually connected to vent 505, thereby connecting and allowing pressure equalization between vessels 401, 501, and 604. It is preferred that the cross-sectional areas of vents 405, 505, and 506 be proportioned in the same relationship as the proportions among the cross-sectional areas of the respective liquid and gas outlets from the interior of degassing tube 301 and tube 101, to facilitate maintenance of the desired respective liquid and gas volumetric flow rates from the interior of tubes 301 and 101. When, as described above, the flow of gas from tube 101 is evenly distributed between gas duct 303 and gas duct 601, the cross-sectional areas of vent lines 505 and 506 are equal. However, if the gas flow rates from the two ends of tube 101 are unequal, the cross-sectional areas of vent lines 505 and 506 should be proportioned accordingly.

With the controlled venting of and the resulting control over the pressure relationships among the liquid and gas receiving vessels, pressure fluctuations, flow restrictions, and flow fluctuations are avoided, and steady state operation of the apparatus is achieved and maintained.

The method of the invention, utilized in conjunction with the described apparatus, is directed to creating and maintaining conditions of gas-liquid interfacial contact favorable for the molecular transfer of a selected component (or components) between gas and liquid phases, to preventing reverse or retrograde transfer of the component(s), and to separation of the exiting liquid from the exiting gas. It will be understood that interphase mass transfer is a physical operation common to a variety of industrial processes, including stripping components from liquids, absorbing components from gases, dissolving gas components in liquids, evaporatively concentrating liquids, and chemically reacting gas and liquid components, as non-limiting examples. The method of the present invention is broadly applicable to any operation involving interphase mass transfer, in providing a means of creating gas-liquid interfacial contact conditions conducive to maximizing the overall efficiency of the transfer.

In an operational context, the method of the invention includes the following basic steps: introducing a stream of liquid to the hollow interior of a cylindrical tube in a thin film following a spiral flow pattern around and along the wall of the tube; controlling the physical characteristics of the liquid film and the flow pattern followed by the film through the tube; sparging gas through the wall of the tube and into the liquid film at a preselected flow rate; segregating gas from the liquid within the tube following passage through the liquid; and separating the exiting liquid stream from the exiting gas stream so as to prevent remixing and reverse transfer.

With the preferred embodiment of the apparatus of the invention described above, the liquid stream is introduced to chamber 107 of tube 101 through nozzle 207 in a thin film ribbon that spirals around inner surface 106 of porous wall 104. The creation and maintenance of specific physical properties of that film and its flow through chamber 107 are important to efficient performance of the method of the invention, due to the importance of controlling contact between the liquid film and the gas sparged through porous wall 104. The physical properties of particular significance within the method include the thickness of the film, the speed of travel of a given volume of liquid forming the film along the spiral path, and the number of "turns" around the inner surface of the porous wall made by any given volume of liquid. These properties are dependent upon the physical design of the apparatus used to perform the method and the selected flow rate at which the liquid is introduced to the apparatus.

As a general, and non-limiting example, consider an apparatus within the scope of the invention in which the inside diameter of chamber 107 of tube 101 is within the range of about 2 inches to about 6 inches. An inside diameter of 2.94 inches corresponds to a readily available dimension for porous tubes formed of sintered stainless steel. It will be understood that the apparatus is scalable. The "scalability" of the apparatus is based upon the maintenance of a force field of specific magnitude, flow rate ratios, and bubble contact time within a transfer unit, and it will be understood that there may be a practical limit of scale versus utilization of multiple units of apparatus to accommodate large flow rates. In the preferred embodiment of the method the annular area occupied by the undisturbed film at any given cross-sectional point along tube 101 is about one third of the cross-sectional area of chamber 107, yielding a film thickness within the range of about 0.18 inch to about 0.55 inch in this example. In the apparatus of the example, the length of tube 101 is within the range of about 24 inches to about 60 inches. As noted above, the length of tube 101 may be adjusted as a means of controlling the number of radial turns made by the liquid as it moves longitudinally down the length of tube 101. Alternatively, the width of the "ribbon" of liquid may be reduced to achieve the desired number of turns in a shorter tube length, which makes the length of the porous tube a readily adjustable variable for achieving desired results. Consistent with these parameters, a corresponding liquid flow rate within the range of about 15 gallons per minute to about 200 gallons per minute may be utilized, yielding a residence time within the apparatus of 0.5 second or less for each incremental volume of liquid.

As the liquid flows through chamber 107 in the controlled spiral pattern created in accordance with the invention, gas is sparged through porous wall 104 and into immediate contact with the moving liquid in chamber 107. In accordance with the method of the invention, the liquid is moving at a high rate of speed across the pores through which gas exits from the inner surface of the porous wall, and gas moving into the liquid flow from the stationary pores is immediately sheared from the wall by the tangential force of the moving liquid. Each incremental volume of gas assumes the form of a generally spherical bubble, surrounded by liquid. The surface of each spherical bubble is thus a liquid to gas interface across which mass transfer may occur. It is known that since the surface area of a sphere is proportional to the square of its radius and the volume of a sphere is proportional to the cube of its radius, the ratio of surface area to volume increases with decreasing spherical diameter. Decreasing the size of the bubbles thus increases the area of interfacial contact available for mass transfer between a given volume of liquid and a given volume of gas. The size of the bubbles formed in the apparatus of the invention is determined by four factors; the dimension of the pores through which gas exits porous wall 104, the speed of the liquid across the pores, the exit speed of the gas from the pores toward the center of the porous tube, and the centrifugal force created by the swirling liquid. Pore sizes in the range of 0.5 micron to 40 microns have been found to be practical in the selection of material for construction of tube 101, and pore sizes in the range of about 0.5 micron to 20 microns are preferred, with pore sizes in the range of about 0.5 micron to 10 microns particularly preferred. The liquid speed and the magnitude of the centrifugal force field are determined by the liquid flow rate and the inside diameter of tube 101, and the gas exit speed is determined (for a given tube construction) by the volumetric flow rate of the gas. From the stated values for those factors, the bubble size may be determined to be within the range of about 0.5 micron to about 50 microns.

The creation and maintenance of a multitude of small gas bubbles intermixed with the liquid also favors mass transfer between the liquid and the gas by minimizing the physical distance through the space occupied by liquid between bubbles, and thus minimizing the distance that any molecule must travel through the liquid to the interface. For any given bubble size, the distance between bubbles tends to decrease as the volumetric flow rate of gas relative to liquid increases. In the prior art approaches to mass transfer, the diffusion of the transferring molecules through the liquid phase to or from the gas-liquid interface is a limiting factor in interphase mass transfer, since the diffusivities of gases are on the order of magnitude of $10^4$ times the diffusivities of liquids. However, in the two phase froth created within tube 101 by the mixing of a volume of extremely small gas bubbles with an approximately equal volume of liquid in each transfer unit, each bubble may be considered to be in near contact with the immediately adjacent bubbles, so that each bubble is surrounded by a liquid film of minimal thickness. In those conditions the maximum distance any molecule of a transferring component must move through the liquid to an interface is approaching zero, and liquid diffusivity ceases to be a significant factor in limiting the rate of transfer.

Each transfer unit within the apparatus of the invention contains an order of magnitude of 1000 total moles of liquid per total mole of gas. If the mass transfer is from the gas phase to the liquid phase, the mass transferred from any bubble of gas to the surrounding liquid has a minor effect upon the mole fraction of the transferring component in the liquid at the interface. Therefore, the effect of the concentration gradient is insignificant, and any resistance to transfer must be in the gas phase. In chemical engineering, when $$X_{Ai}=X_A$$

where $X_{Ai}$=mole fraction of component A at the interface $X_a$=mole fraction of component A in the bulk solution the gas phase resistance is considered to be controlling, since there is minimal concentration gradient across the liquid phase and any resistance to transfer is considered to be in the gas phase. However, because the gas bubbles formed within the apparatus of the invention operated in accordance with the parameters of the method are of very small dimension, and because the molecular diffusivity within the gas phase is comparatively rapid, the transport of molecules of the transferring component to the interface is, for practical purposes, instantaneous. Therefore, gas phase diffusivity offers no effective limit to mass transfer rate.

When the mass transfer is from the liquid phase to the gas phase, the concentration gradient in the liquid phase has traditionally been of great importance, since molecules of the transferring component cannot transfer until they reach the interface and diffusivity in liquids is, as noted above, much lower than in gases. However, under the contact conditions created within the apparatus of the invention liquid diffusivity is effectively eliminated as a limiting factor not only because the liquid film thickness is minimized, but also because the mixing of gas and liquid in the froth is highly turbulent and the movement of bubbles through the surrounding liquid is very dynamic. The rapid relative movement creates a rapid exchange of the liquid surrounding each gas bubble and increases the effective rate of movement of transferring component molecules to the interface. With the method and apparatus of the invention the distance between bubbles is sufficiently small and the contact between bubbles and liquid sufficiently dynamic to effectively eliminate the limit on mass transfer associated with liquid diffusivity.

Since neither gas diffusivity nor liquid diffusivity limit the rate of mass transfer under the conditions produced by the method and the apparatus, mass transfer to the point of equilibrium is effectively instantaneous between each bubble and the immediately surrounding liquid, and transfer rate is effectively eliminated as a design constraint. In effect, the two phase froth created by the method and apparatus of the invention may be viewed as a system in which only gas to liquid interface conditions exist, with neither bulk liquid nor bulk gas volumes. Accordingly, the interfacial contact area is extremely large.

These conditions cannot be created in prior art mass transfer apparatus, or by prior art methods, because of their inability to create physical systems in which generally equal volumes of gas and liquid can be in direct contact with significant overall transfer area relative to the overall volume at any given time. Such systems require large numbers of extremely small bubbles existing in very close proximity within a controlled froth, with continuous introduction of new bubbles to the froth and removal of an equivalent volume of gas from the froth without entrainment of the liquid through which the gas bubbles move at high velocity. As discussed below, these physical requirements can be achieved only by apparatus in which the liquid is in rapid movement orthogonal to the flow vector of incoming gas, and in which the gas-liquid mix (froth) exists in a radial force field.

With consideration to these factors, and with the preferred dimensions of chamber 107 referred to above, a liquid flow rate within the range of about 15 gallons per minute to about 200 gallons per minute, and an overall gas to liquid volume ratio up to about 50 to 1 have been found to be effective parameters for the method of the invention.

The behavior of the gas bubbles and the characteristics of their movement through the liquid is also material to the efficiency of the mass transfer operation, and is a significant factor to the effectiveness of the method of the invention. As the gas bubbles are sheared from porous wall 104 by the flowing liquid, those bubbles are immediately entrained in the flow of liquid and follow the same general spiral flow pattern around and along the wall of the tube. Simultaneously, and immediately upon separation from the wall, the bubbles also begin traveling through the liquid toward the center of chamber 107, in a direction orthogonal to the motion of the liquid stream, or radial to the tube. The radial flow of the bubbles is a result of their buoyancy relative to the liquid under the operating conditions of the system. The highest velocity the bubbles may achieve through the liquid film is described by Stokes Law, from which the terminal velocity may be calculated.

As the liquid spirals around the inner surface of the tube within the range of effective operating parameters, a centrifugal force field of significant magnitude is created, and corresponding centrifugal acceleration is imposed on the liquid film and on the gas bubbles formed within the liquid. The centrifugal acceleration at the inner surface of the porous tube generally ranges from about 400 G to about 1500 G (where G is the standard gravitational acceleration). At those centrifugal accelerations the radial movement of the gas bubbles through the liquid film is not materially affected by the earth's gravity, since the gravitational acceleration is insignificant in comparison to the centrifugal acceleration, and the bubble behavior may be considered to be uniform at all positions around the tube. Due to the velocity profile of the flowing froth, the velocity of the froth increases as the distance from the fixed wall of the porous tube increases. As the distance from the wall increases, the radial distance from the center of the tube to a point in the froth decreases. The acceleration field correspondingly varies with distance from the tube wall in accordance with the following acceleration equation:

$$a=V^2/R$$

where a=acceleration

V=radial velocity, and

R=distance from the center of the tube

The combination of increase in velocity and decrease in radius causes the magnitude of the centrifugal force field to increase up to 600% at the inner surface of the froth layer, where the gas exits to the center of the tube following its passage through the liquid. In general, the specific gravity of the gas is less than about 0.1% of the specific gravity of the liquid, so the force imposed on the liquid greatly exceeds the force imposed on the exiting gas. The liquid is therefore strongly forced toward the wall of the porous tube while liquid-free gas is minimally affected. When a bubble emerges from the froth layer at the boundary, the forces acting on the bubble exceed the surface tension of the liquid film surrounding the gas and defining the bubble, the bubble ruptures, the released gas enters the gas core at the center of the tube, and the liquid returns to the froth phase.

To prevent a continuous froth phase from existing in the tube there must be a discrete phase change from the froth to the non-froth gas core at the boundary. That is, the bubbles present in the froth phase must cease to exist at the boundary. This is accomplished by maintaining a sufficiently large pressure differential to cause each bubble to rupture at the boundary between the phases.

At the boundary each bubble makes a transition from being a bubble surrounded by liquid (within the froth) toward a bubble exiting into a free gas phase. For a bubble of gas surrounded by a liquid, it has been determined that the differential between the pressure on the inside of the bubble versus the pressure on the outside of the bubble may be expressed by the equation:

$$P_O = 2\gamma/R$$

where $P_O$=Pressure differential between the inside of a bubble and the outside of a bubble when the bubble is surrounded by liquid $\gamma$=surface tension of the liquid R=Radius of the bubble It has further been determined that when a bubble formed by a liquid containing gas is surrounded by gas, the differential pressure may be expressed by the equation:

$$P_G = 4\gamma/R$$

where $P_G$=Pressure differential between the inside of a bubble and the outside of a bubble when the bubble is surrounded by gas $\gamma$=surface tension of the liquid R=Radius of the bubble Comparison of these relationships shows that the pressure differential doubles when the bubble crosses the boundary of the bulk phase of liquid and gas, thereby effectively doubling the relative internal pressure. The bubbles crossing that boundary are of very small dimension and are moving rapidly toward the center of the tube, so the doubling of pressure occurs very quickly. The doubling of effective internal pressure causes a rapid expansion of each bubble. When the expansion force overcomes the surface tension of the liquid film defining the bubble, the bubble ruptures, separating the gas and liquid at the boundary. As described above, the released gas remains within the gas column at the center of the tube, whereas the liquid is forced to return to the froth phase by the centrifugal force acting upon it. In general, it has been determined that a change in differential pressure on the order of magnitude of two atmospheres is sufficient to cause bubble rupture.

As a non-limiting example, it has been experimentally determined that this phenomena occurs, and bubbles will rupture at the boundary when the surface tension of the liquid is within the range of about 55 to 80 dyne/cm and the radius of the bubbles is within the range of about 1 micron to about 10 microns. When the surface tension decreases (due to surface tension modifiers—detergents, soaps, or different liquid constituents) the effect of this phenomena is reduced, and rupture may no longer occur. Under those conditions the froth phase extends into central portion of the tube and the operation of the equipment is less effective.

It can be seen from the pressure differential equations presented above that the pressure differential is directly proportional to the surface tension of the liquid and inversely proportional to the radius of the bubble. For a given surface tension, the pressure differential can be varied by changing the bubble radius. Similarly, as surface tension decreases, a desired pressure differential can be achieved by reducing the bubble radius. The relationship between the surface tension of the liquid and the radius of bubbles created in the operation of the apparatus therefore provides a mechanism for controlling the pressure differential and thus assuring rupture of the bubbles at the boundary. In the method of the presently disclosed invention, bubble radius is decreased to compensate for decreasing liquid surface tension. For any given system conditions, bubble radius can be calculated and/or determined experimentally.

Minor variation in surface tension may be compensated by increasing the flow rate through the equipment, which increases the centrifugal acceleration and, in turn, increases the initial pressure inside the bubble in accordance with the relationship expressed by the following equation:

$$P_{max} = 2\gamma/R + gh(\rho_L - \rho_G)$$

where $P_{max}$=the maximum pressure inside the bubble g=acceleration due to the radial force field h=thickness of the liquid layer $\rho_L$=density of the liquid $\rho_G$=density of the gas It will also be noted that changing the thickness of the inlet liquid layer may increase the $P_{max}$ in a given force field, but these adjustments would be minimal in relationship to the correction afforded by changing the bubble radius, by increasing the density of the liquid, or by decreasing the density of the gas.

The size, and thus the radius, of the bubbles formed at the wall of the porous tube is determined by four factors; the dimension of the pores through which gas exits the porous wall, the speed of the liquid across the pores, the exit speed of the gas from the pores toward the center of the porous tube, and the centrifugal force created by the swirling liquid. Pore sizes in the range of 1 micron to 40 microns have been found to be practical in the selection of material for construction of the tube, and variation of pore sizes within that range should allow sufficient control of bubble size to achieve bubble rupture at the boundary. The liquid speed and the magnitude of the centrifugal force field are determined by the liquid flow rate and the inside diameter of the tube, and the gas exit speed is determined (for a given tube construction) by the volumetric flow rate of the gas and by the speed of the liquid flowing over the pore openings in the inner surface of the tube wall.

It is known that the orthogonal flow of liquid across the opening of a narrow tube or capillary creates a pressure drop in the tube. This phenomena is known as the venturi effect, and it has been determined that the flow of liquid across the pores in the wall of the porous tube affects the flow rate of gas through the tube.

Within the general method to which this disclosure relates, and in apparatus used to perform the method, the froth layer is controlled, and exists because the gas has sufficient driving force (from the pressure differential between the pressurized gas in the plenum and the gas core at the center of the porous tube, and the venturi effect tending to draw gas through the pores) to pass through the porous tube and through the pressure force of the liquid on the inner surface of the tube. Although the centrifugal force created by the radial liquid flow increases the liquid pressure at the tube wall in comparison to the pressure imposed by the same thickness of static liquid, the venturi effect resulting from the radial movement of the liquid over the pores through the wall of the tube is an offsetting factor that reduces the plenum pressure required to move a given volume of gas through the tube, and contributes significantly to the operating efficiency of the system.

In general, bubble radius may be effectively controlled by deceasing the diameter of the pores penetrating the wall of the tube. It should be understood from the immediately foregoing discussion that the increase in plenum pressure required to move the gas through smaller pores is at least partially offset by the contribution of the venturi effect, and the differential in operating cost is accordingly reduced.

A given volume of gas must pass through a given volume of liquid, and while these volumes are in contact a two phase volume equal to the combination of the gas and liquid volumes exists within the tube. This volume is proportional to the cross-sectional area of the two phase froth inside the tube at any point along the length of the tube. When the given volume of gas has made its transit through the two phase flow zone, it exits as a pure gas phase, because the liquid in the two phase flow zone cannot overcome the centrifugal forces holding it in a lower energy field. Accordingly, the method of the invention eliminates any possibility of the existence of froth or foam at the center of the tube, and results in a clean division between the froth phase and the "post-contact" gas phase.

For any given system of gas, liquid, and transferring component, with given apparatus design and operating conditions, the residence time of a gas bubble in the liquid can be controlled. Since the time required for transfer equilibrium to be reached in each gas bubble-surrounding liquid system can be treated as effectively instantaneous, as discussed above, the bubble residence time can be treated as exceeding the time required to achieve equilibrium within any given transfer unit, and transfer unit efficiencies approaching 100% of the theoretical maximum can be achieved.

Once any given volume of gas has passed through the liquid, that gas should be removed from the core of the tube as quickly as reasonably possible, to prevent any reverse transfer of the originally transferred component and to avoid increase in gas pressure within the tube. In the preferred embodiment of the method gas is removed from the porous tube at both ends, driven by the flow of gas newly exiting the froth. The overall gas flow from the apparatus is thus bi-directional, or bi-current with the flow of liquid, and any given volume of gas will generally exit the tube through the end closer to the point at which that volume of gas exits from the froth.

The desired gas flow characteristics are maintained by interactive determination of the proportions among the components of the apparatus and liquid flow characteristics. The liquid phase occupies a specific proportion of the volume of chamber 107 without introduction of gas, the volume of gas mixed with liquid in the two phase froth accounts for a specific proportion of the volume of chamber 107, and the free gas column in the central portion of chamber 107 occupies a specific proportion of the volume of that chamber. As noted above, these volumes are proportional to the cross-sectional area of chamber 107 occupied by each phase. The proportion of the cross-sectional area of chamber 107 occupied by the froth may be varied to a degree by adjustment of gas flow rate, but the combined cross-sectional area of the gas outlet routes should not be less than the cross-sectional area of the free gas column in chamber 107. As a specific example, when the liquid itself occupies one-third the volume (and cross-sectional area) of chamber 107 prior to gas introduction and the froth comprises equal volumes of gas and liquid, the free gas column will occupy one-third the volume (and cross-sectional area) of chamber 107, and each exit route may be one-sixth the cross-sectional area of chamber 107.

It is highly desirable that the thickness of the two phase froth (measured radially from the inner surface of tube 101) remain constant throughout the length of the porous tube, since variations in froth thickness produce variations in the flow of gas radially through the froth and in the dimensions of the gas column at the center of chamber 107. Such variations, if allowed to occur, will detrimentally affect the efficiency of mass transfer and the flow characteristics of that gas column through tube 101 and into gas duct 303. Maintenance of a uniform froth thickness is achieved by generally horizontal orientation of the axes of the tubes comprising the apparatus of the invention relative to the earth's gravitational field, as it has been found that significant thinning of the film inevitably occurs toward the lower end of the apparatus when those axes are oriented vertically.

It is also important that the thickness of the froth and the gas free liquid film remain respectively constant around the inner circumference of the porous tube and the degassing tube, both for uniform and consistent gas flow and for proper separation of the liquid and gas streams by the apparatus of the invention. As discussed in the context of the apparatus of the invention, precise separation of gas and liquid streams by the knife edge of the gas duct is a significant factor in preventing reverse material transfer and thus maintaining the overall efficiency and material transfer performance of the apparatus and method, and that precise separation depends, in turn, upon uniformity of the annular film of liquid at the location of the first end of the gas exit port.

Taking the foregoing factors and parameters in combination, the preferred embodiment of the method of the invention, performed in apparatus as disclosed and described, comprises the following general steps:

1. introducing a stream of liquid to the first end of a porous cylindrical tube, of greater length than diameter, tangential to the interior surface of the tube;
2. controlling the flow of the liquid in a spiral pattern around and along the inner surface of the porous tube from the first end to the second end, so as to impose centrifugal accelerations within the range of about 400 G to about 1500 G on the liquid at the inner surface of the porous tube;
3. sparging a gas through the wall of the porous tube and through the liquid spiraling through the tube at an overall gas to liquid volumetric flow ratio of up to about 50 to 1, whereby the overall gas to liquid flow rate is divided into a number of individual transfer units in which the interfacial contact area between gas and liquid is extremely large, whereby highly efficient material transfer between liquid and gas is achieved;

4. ceasing sparging of gas into the liquid in a region adjacent to the second end of the tube while allowing the liquid to continue spiraling toward the second end of the tube for a sufficient distance and time to allow degassing of the liquid and separation of the gas and liquid into an annular film of liquid around the inner circumference of the tube and a column of gas at the center of the tube;
5. drawing the column of gas toward both the first end and the second end of the tube in bi-current flow with the movement of liquid along the tube;
6. removing a first portion of the gas from the apparatus through a cylindrical duct at the first end of the apparatus;
7. physically dividing liquid from gas at the second end of the tube by interposing a cylindrical duct between the gas and the liquid at the interface between the gas column and the annular liquid film;
8. removing the liquid from the apparatus; and
9. removing the gas through the cylindrical duct from the apparatus.

The preferred method of the invention provides highly efficient material transfer between liquid and gas phases in conjunction with the apparatus of the invention, and effectively achieves a previously unprecedented approach to optimal mechanical parameters for operation of an interphase mass transfer system. As discussed above in reference to alternative apparatus embodiments, alternative embodiments of the method of the invention may be utilized. More specifically, with apparatus in which the gas is removed from the apparatus through a single outlet associated with the second end of the porous tube, step 5 recited above is modified to draw gas only toward the second end of the tube, in co-current flow with the flow of liquid, and step 6 is omitted.

With regard to a multiple component system, a general expression of the efficiency of mass transfer, in terms of a ratio of the concentration of the transferring component in the entering liquid to the concentration of that component in the exiting liquid, can be stated as follows:

$$C_{in}/C_{out}=(1+KM_G/M_L)$$

where
$C_{in}$=initial concentration of the component in the liquid phase
$C_{out}$=final concentration of the component in the liquid phase
K=the equilibrium constant for the component, and
$M_G$=moles of gas
$M_L$=moles of liquid For given molar flow rates the theoretical limit of change in concentration, as a ratio, is thus known.

In tests of the apparatus and method of the invention the average transfer unit performance in relationship to the theoretical basis has varied from about 89% to about 99%. When performance results are plotted to the appropriate equilibrium curve on a consistent unit basis the slope of the operating curve is virtually vertical and performance closely approaches the theoretical operating curve. For example, the slope of a theoretical operating curve is $M_L/M_G$=1350 when equal volumes of gas and liquid are in total contact or equilibrium, on a mass balance basis. When test data of 93% efficiency is returned to the equation the slope of the actual operating curve is 994.

For an water-air system in which equal volumes of gas and liquid are in contact at any given time, the total moles of liquid in contact with a single mole of gas within a single transfer unit is on the order of magnitude of 1000, but may be varied, by adjusting the volumetric ratio, to achieve a specified transfer objective. The theory is well established and has been known in the chemical engineering field and related fields for many years. However, the ability to establish and control overall mole ratio conditions stated above has not existed prior to the present invention.

The present invention establishes and controls the mole ratio conditions by placing the transfer unit within a radial gravitational field, and produces multiple transfer units within a single operating unit. Each selected volume of gas passes through the liquid only once within a transfer unit, but the liquid is sequentially subjected to multiple transfer units to achieve an overall objective.

With multiple transfer units, and accounting for overall flow ratio as well as flow ratio within each transfer unit, the relationship can be expressed as:

$$C_{in}/C_{out}=(1+KS)^E$$

where
$C_{in}$=initial concentration of the component in the liquid phase
$C_{out}$=final concentration of the component in the liquid phase
K=the equilibrium constant for the component, and
$S=(MV_L/MV_G)(R)$
where
$MV_L$=molar volume of the liquid phase
$MV_G$=molar volume of the gas phase
$R=v_g/v_l$
where
$v_g$=volume of gas in a transfer unit
$v_l$=volume of liquid in a transfer unit
and the overall volumetric ratio is given by the relationship, $$V_G/V_L = \sum_{i=1}^{E} v_{gi}/v_{li}$$

where
$V_G$=total gas volumetric flow rate
$V_L$=total liquid volumetric flow rate
E=number of transfer units down the length of the unit
i=an incremental transfer unit.

These relationships provide a mathematical model for the operation of the method of the invention, and provide a means for selection of operating parameters to maximize the efficiency of operation for any selected system of gas, liquid, and transferring component.

Within any given transfer unit there are limits to the volumetric contact ratio of gas to liquid, because of the necessity of maintaining a discrete gas column at the center of chamber 107. In practice, the maximum froth thickness that can be maintained is the equivalent radius equal to twice the cross-sectional area of the undisturbed liquid film. Therefore, in practice the maximum gas to liquid contact ratio in a transfer unit is two ($v_g/v_l$=2). When optimization is based upon maximizing the quantity of liquid processed (e.g., in a stripping operation), the liquid flow is set in a given apparatus so that the undisturbed liquid occupies about one-third the volume (and cross-sectional area) of chamber 107, and the maximum gas to liquid contact ratio in a transfer unit is 1.5, since the free gas column must then occupy a minimum of one-sixth the volume (and cross-sectional area) of the chamber. It can thus be seen that a gas to liquid ratio of one ($v_g/v_l=1$), equivalent to the 1000 moles of liquid in contact with one mole of gas referred to above, is well within the operating limits of the apparatus. By comparison, a ratio of 50 moles of liquid to one mole of gas is generally viewed as an upper limit for conventional mass transfer apparatus and methods.

For any selected contact ratio, the steady state volumetric flow ratio between the total volume of gas passed through the porous tube and the total volume of liquid passed through the tube is determined by the residence time of the gas in the froth, which is determined or controlled by the radial velocity of the bubbles through the froth. That radial velocity is, in turn, determined by the plenum pressure and the buoyancy forces created by the centrifugal force field produced by the swirling froth. As a purely illustrative example, for a contact ratio of 1, and if the residence time for any incremental volume of gas in the froth is 1/20 the residence time for that incremental volume of liquid in the tube, the total volumetric flow ratio of gas to liquid is 20; i.e., the gas to liquid volumetric flow ratio may be selected as equal to the incremental liquid residence time in the tube divided by the incremental gas residence time in the froth.

Since, as shown by the relationship for concentration ratios in multiple transfer units, the overall mass transfer performance is exponential, in direct relation to the number of transfer units, the apparatus and method of the invention raise mass transfer performance to unprecedented levels. Based upon operational data and the description of a theoretical transfer unit, it is predicted by the model, and it has been experimentally demonstrated, that the average component transfer achieved with the apparatus and method of the invention is in excess of 92% of the transfer that would occur at thermodynamic equilibrium. Accordingly, the average operational efficiency, in terms of approach to theoretical maximum, is in excess of 92%, and operational performance in the range of 99% has been achieved.

It should be noted, and will be understood by those skilled in the art, that efficient operation of interphase mass transfer apparatus and efficient control of process operating parameters as disclosed above does not necessarily result in the complete or even substantially complete transfer of all types of volatile materials to or from water or other liquids. It must be recognized that effective mass transfer performance is dependent upon the properties of the material to be transferred; i.e., the degree to which a particular contaminant compound is amenable to mass transfer across a gas-liquid interface in response to a concentration gradient. It will be understood that the maximum practical performance of any gas phase "single pass" mass transfer apparatus and method in general, and the apparatus and method of the invention in particular, is directly related to the vapor-liquid equilibrium factor for the component to be transferred. In general, the higher the differential between the concentration of a component in the entering stream and the equilibrium concentration, the higher the transfer performance achievable in a single pass. Because of the dynamics of the liquid flow through the apparatus, there is a practical limit to the length of the tube through which the liquid may be spiraled before the liquid film flow pattern decays beyond acceptable limits, and there is thus a practical limit to the volume of gas that can be moved through the liquid in a single pass through any apparatus. The apparatus and method of the invention provide highly efficient mass transfer approaching the theoretical limits. Further mass transfer may be achieved by recycling the liquid or the gas through the apparatus, or by passing the liquid or the gas through additional units of the apparatus. For some transfer systems it is contemplated that adjustment of temperatures and/or pressures may be economically and effectively used to increase overall performance by optimizing the equilibrium achieved between the gas and liquid phases. All vapor-liquid equilibrium is affected by temperature, and the temperature of the incoming liquid is a variable that can be controlled to achieve desired results.

For example, in stripping operations, used to transfer a volatile component or components from a liquid to a stripping gas, the partition coefficient for the equilibrium relationship is related to the Henry's Constant for the targeted component(s). In general, the higher the Henry's Constant, the higher the removal performance achievable in a single pass. The value of Henry's Constant for volatile compounds is dependent upon and proportional to the temperature of the compound or of a solution containing the compound, and the increase in Henry's Constant with increasing temperature is pronounced. This property may be utilized within the context of the method of the invention for stripping operations by increasing operating temperature (i.e., heating the incoming liquid containing the targeted component) to improve the overall performance of the apparatus and method when Henry's Constant for the targeted component is inherently low or is suppressed by low ambient temperatures.

The apparatus and method of the invention also provide equivalent performance in terms of thermodynamic efficiency, yielding unprecedented advantages for, e.g., evaporative processes. As a bubble of gas moves through the two-phase froth toward the center of the tube, the bubble expands due to the lower net force of the liquid pressing on the surface of the bubble. The bubble expands until the surface tension of the liquid film surrounding it is overcome by the radial acceleration field and the bubble ruptures, releasing the gas to the free gas column at the center of the tube. The liquid is, as discussed above, forced back into an area of lower force and cannot move into the gas column due to its higher density.

The pressure inside any bubble at the point of bubble creation at the inner surface of the porous tube is controlled in accordance with the equation $$P_{max}=2\gamma/R+gh(\rho_L-\rho_G)$$

From this initial pressure the bubble will expand as it moves through the froth, since the thickness of the liquid in the froth "above" the bubble (toward the center of the tube) decreases. Additionally, as the bubble expands the pressure induced by the surface tension will relax as the radius of the bubble increases due to the lowering pressure. In effect, there is a dual reduction of pressure, allowing an increase in volume. The volume increase is fed by transfer of the most volatile component from the liquid surrounding the bubble in accordance with its vapor-liquid equilibrium potential. This phenomena is, in effect, the optimization of the mass transfer potential.

When the volumetric ratio of gas in contact with liquid at a given time is 1 to 1, the mass ratio is on the order of 0.0012 masses of gas to 1.0 mass of liquid (in an air-water system). Since the specific heats of gases relative to liquids are on the order of 1.5 to 1, the temperature of the liquid will change minimally relative to the temperature of the gas, with a temperature change ratio on the order of 0.002. From these ratios and relationships it can be seen that the system operates at essentially constant pressure and temperature; i.e., as an isothermal and isobaric system.

When an energy and mass balance is calculated based on comparison of initial and final conditions, the energy balance requires that there be a drop in the temperature of the liquid to compensate for the latent heat of vaporization of the mass transferred from the liquid to the gas. In an air-water system the mass transferred from the liquid to the gas is water vapor. In such an air-water system, in which the molar ratio is 1350, operating at 200 degrees F, the temperature drop of the liquid will be less than 4 degrees F when the incoming air has low relative humidity. That energy loss, which accounts for the latent heat of the water evaporated, may be recovered by condensing the water from the gas exit stream by heat exchange with the entering water stream, and the system functions with net energy losses approaching zero.

Evaporative processes utilizing the apparatus and method of the invention should operate below the boiling point of the liquid; i.e., the vapor pressure of the transferring component should be less than the total pressure of the system. Otherwise, the liquid will flash upon introduction to the apparatus and interfere with the fluid dynamics of the system. In all cases, the partial pressure of the transferring component in the incoming gas must be in proper relationship to the partial pressure of the transferring component at equilibrium, in order for a phase change to occur. Specifically, for stripping and evaporative processes the partial pressure of the transferring component in the incoming gas must be less than the partial pressure of that component at equilibrium, and for absorptive processes the partial pressure of the transferring component in the incoming gas must be greater than the partial pressure of that component at equilibrium.

The method and apparatus of the invention allow an unprecedented level of control over conditions of gas-liquid contact, and provide unprecedented levels of performance. It is to be understood that the foregoing description of the preferred embodiments of the apparatus and method of the invention are illustrative and not for purposes of limitation. It is also to be understood that both apparatus and method are amenable to various alternative embodiments and modifications in addition to those described, all remaining well within the scope of the invention.

We claim:

1. Apparatus for creating gas-liquid interfacial contact conditions for efficient mass transfer, comprising a gas-liquid contactor assembly with a first end and a second end and a longitudinal axis, including at least one coaxially aligned cylindrical porous tube with a first end and a second end, a longitudinal axis, an outer surface and an inner surface, and a hollow interior, said at least one porous tube being penetrated by a multiplicity of pores extending from said outer surface to said inner surface, each of said pores providing a passageway for the flow of gas therethrough to said interior of said at least one porous tube, and further including at least one nonporous outer jacket disposed concentric with said at least one porous tube and interconnected thereto so as to form at least one closed gas plenum, said at least one outer jacket having at least one gas inlet port disposed therein for introduction of gas to said at least one closed gas plenum formed thereby;

liquid feeding means for feeding liquid to the interior of said at least one porous tube at said first end of said gas-liquid contactor assembly in a spiral flow pattern around and along said inner surface of said at least one porous tube from said first end to said second end of said gas-liquid contactor assembly; and a gas-liquid separator assembly including a nonporous cylindrical degassing tube, having a first end of the same inside diameter as said second end of said at least one porous tube at said second end of said gas-liquid contactor assembly, and a second end, disposed in coaxial alignment with said gas-liquid contactor assembly with said first end of said degassing tube connected to said second end of said porous tube at said second end of said gas-liquid contactor assembly so as to provide an uninterrupted flow path from said porous tube to and through said degassing tube, and including a gas outlet port with a first end and a second end, disposed in coaxial alignment with said gas-liquid contactor assembly and said degassing tube so as to provide a flow path for gas from said degassing tube into said gas outlet port.

2. The apparatus of claim 1, wherein said liquid feeding means comprises a liquid feed assembly including a nonporous extension tube of the same cross-sectional dimension and configuration as said at least one porous tube, having a first end and a second end, disposed in coaxial alignment with and interconnected at said second end thereof to said first end of said porous tube at said first end of said gas-liquid contactor assembly, said extension tube having a wall, an outer surface and an inner surface, and a hollow interior, and said extension tube further having a slot shaped aperture extending through said wall thereof for introduction of liquid therethrough, and further including a feed head having an inlet nipple and a slotted nozzle connected between said inlet nipple and said extension tube in communication with said slot shaped aperture.

3. The apparatus of claim 2, wherein said feed head of said liquid feed assembly further includes an acceleration chamber connected between said inlet nipple and said slotted nozzle, said acceleration chamber narrowing in cross-sectional area from said inlet nipple to said slotted nozzle so as to increase the velocity of liquid flowing therethrough.

4. The apparatus of claim 3, wherein said slotted nozzle is disposed relative to said extension tube such that liquid flowing from said slotted nozzle into said interior of said extension tube through said slot shaped aperture enters said extension tube tangential to the curvature of said inner surface thereof and at an angle relative to a plane perpendicular to the aligned longitudinal axes of said extension tube and said porous tube.

5. The apparatus of claim 4, wherein said feed head of said liquid feed assembly further includes a flow defining means for directing the flow of liquid in a spiral pattern around and along said inner surface of said extension tube toward said porous tube.

6. The apparatus of claim 5, wherein said flow defining means comprises a flow definer including a helical ramp to receive and direct the flow of liquid from said slotted nozzle, said helical ramp having a surface, an upstream edge, and a downstream edge, and further including a ledge extending from said surface and along said upstream edge of said helical ramp to maintain the flow of liquid along said surface of said helical ramp.

7. The apparatus of claim 1, wherein said gas outlet port has a side wall, and wherein said side wall of said gas outlet port narrows in proximity to said first end thereof to form a knife edge at said first end thereof.

8. The apparatus of claim 7, wherein said degassing tube increases in inside diameter adjacent to said second end thereof, and wherein the angle through which said side wall of said gas outlet port narrows is approximately equal to the angle through which said inside diameter of said degassing tube increases.

9. The apparatus of claim 1, wherein the inside diameter of said degassing tube is constant from said first end thereof to said second end thereof.

10. The apparatus of claim 8, wherein the inside diameter of said gas outlet port is approximately 80% of the inside diameter of said porous tube.

11. The apparatus of claim 1, wherein said degassing tube decreases in inside diameter adjacent to said second end thereof.

12. The apparatus of claim 11, wherein the inside diameter of said gas outlet port is approximately ⅓ of the inside diameter of said porous tube.

13. The apparatus of claim 1, wherein said porous tube at said first end of said gas-liquid contactor assembly is open at said first end thereof and wherein the apparatus further includes a gas outlet duct disposed in coaxial alignment with said porous tube and interconnected to said first end thereof to receive gas from the interior of said porous tube through said first end thereof.

14. The apparatus of claim 13, wherein the inside diameter of said gas outlet port is approximately ⅙ of the inside diameter of said porous tube, and wherein the inside diameter of said gas outlet duct is approximately ⅙ of the inside diameter of said porous tube.

15. The apparatus of claim 1, further comprising a liquid collection assembly to receive liquid flowing from said second end of said degassing tube, including a liquid vessel with a hollow interior in liquid flow communication with said second end of said degassing tube.

16. The apparatus of claim 1, further comprising a gas discharge assembly to receive gas flowing from said second end of said gas outlet port, including a gas vessel with a hollow interior in gas flow communication with said second end of said gas outlet port.

17. The apparatus of claim 13, further comprising a liquid collection assembly to receive liquid from said gas-liquid contactor assembly, a first gas discharge assembly to receive gas flowing from said second end of said gas outlet port, including a first gas vessel with a hollow interior in gas flow communication with said second end of said gas outlet port, and a second gas discharge assembly to receive gas flowing from said interior of said porous tube through said gas outlet duct, including a second gas vessel with a hollow interior in gas flow communication with said gas outlet duct.

18. The apparatus of claim 17, wherein said liquid collection assembly, said first gas vessel, and said second gas vessel are interconnected in gas flow communication, so as to equalize pressure therein.

19. The apparatus of claim 1, wherein said gas-liquid contactor assembly is disposed with said longitudinal axis thereof generally perpendicular to the earth's gravitational field.

20. The apparatus of claim 1, wherein the number of said gas inlet ports is greater than one.

21. The apparatus of claim 20, wherein the number of said closed gas plenums formed by said at least one outer jacket is greater than one and wherein at least one gas inlet port is provided for introduction of gas to each of said closed gas plenums.

22. The apparatus of claim 1, wherein the cross-sectional dimension of said pores penetrating said at least one porous tube is within the range of about 0.5 micron to about 40 microns.

23. The apparatus of claim 1, wherein the cross-sectional dimension of said pores penetrating said at least one porous tube is within the range of about 0.5 micron to about 20 microns.

24. The apparatus of claim 1, wherein the cross-sectional dimension of said pores penetrating said at least one porous tube is within the range of about 0.5 micron to about 10 microns.

25. The apparatus of claim 1, wherein the number of said porous tubes is greater than one, with said porous tubes smoothly mated and interconnected end to end in coaxial alignment, the number of said outer jackets is equal to the number of said porous tubes, with each of said jacket sections connected around a respective one of said porous tubes in end to end in coaxial alignment to form a closed gas plenum associated with each of said porous tubes.

26. The apparatus of claim 2, wherein said extension tube has a curved inner surface, and wherein said slotted nozzle is disposed relative to said slot shaped aperture in said extension tube such that liquid flowing through said slotted nozzle and through said slot shaped aperture enters said extension tube tangential to the curvature of said inner surface of said extension tube.

27. The apparatus of claim 26, wherein said slot shaped aperture and said slotted nozzle are disposed relative to said extension tube such that the flow path followed by liquid entering said extension tube deviates at an angle from perpendicular to the aligned longitudinal axes of said extension tube and said porous tube, whereby the liquid flows in a film around said inner surfaces of said extension tube and said porous tube in a spiral flow path toward said second end of said gas-liquid contactor assembly.

28. The apparatus of claim 27, wherein the angle of deviation of said flow path of liquid entering said extension tube from perpendicular to the aligned longitudinal axes of said extension tube and said porous tube is such that the liquid flows around said inner surface of said at least one porous tube up to about 50 times between said first end and said second end of said gas-liquid contactor assembly.

29. The apparatus of claim 27, wherein the angle of deviation of said flow path of liquid entering said extension tube from perpendicular to the aligned longitudinal axes of said extension tube and said porous tube is such that the liquid flows around said inner surface of said at least one porous tube between about 10 and about 50 times between said first end and said second end of said gas-liquid contactor assembly.

30. The apparatus of claim 27, wherein the angle of deviation of said flow path of liquid entering said extension tube from perpendicular to the aligned longitudinal axes of said extension tube and said porous tube is such that the liquid flows around said inner surface of said at least one porous tube between about 10 and about 40 times between said first end and said second end of said gas-liquid contactor assembly.

31. Apparatus for creating gas-liquid interfacial contact conditions for efficient mass transfer, comprising
a gas-liquid contactor assembly with a first end and a second end and a longitudinal axis, including at least one coaxially aligned cylindrical porous tube with a first end and a second end, a longitudinal axis, an outer surface and an inner surface, and a hollow interior chamber, said at least one porous tube being penetrated by a multiplicity of pores extending from said outer surface to said inner surface, and further including at least one nonporous outer jacket disposed concentric with said at least one porous tube and interconnected thereto so as to form at least one closed gas plenum, said at least one outer jacket having at least one gas inlet port disposed therein for introduction of gas to said at least one closed gas plenum formed thereby;

a liquid feed assembly including a nonporous extension tube of the same cross-sectional dimension and configuration as said at least one porous tube, disposed in coaxial alignment with and interconnected to said first end of said porous tube at said first end of said gas-liquid contactor assembly, said extension tube having a slot shaped aperture therein for introduction of liquid therethrough, and further including a feed head having an inlet nipple and a slotted nozzle connected between said inlet nipple and said extension tube in communication with said slot shaped aperture, for feeding liquid to the interior of said extension tube and said porous tube in a spiral flow pattern around and along said inner surface of said at least one porous tube;

a gas-liquid separator assembly including a nonporous cylindrical degassing tube, having a first end of the same inside diameter and configuration as said second end of said porous tube at said second end of said gas-liquid contactor assembly, and a second end, disposed in coaxial alignment with said gas-liquid contactor assembly with said first end of said degassing tube connected to said second end of said porous tube at said second end of said gas-liquid contactor assembly so as to provide an uninterrupted flow path from said porous tube to and through said degassing tube, and further including a cylindrical gas outlet port with a first end and a second end, disposed in coaxial alignment with said gas-liquid contactor assembly and said degassing tube, said gas outlet port having a continuous side wall with an outer surface and an inner surface, with an outside diameter less than the inside diameters of said at least one porous tube and said degassing tube, with said side wall of said gas outlet port narrowing in proximity to said first end thereof to form a knife edge at said first end thereof, said gas outlet port being disposed with said first end thereof in proximity to said second end of said degassing tube;

a liquid collection assembly to receive liquid flowing from said second end of said degassing tube, including a liquid vessel with a hollow interior in liquid flow communication with said second end of said degassing tube;

a first gas discharge assembly to receive gas flowing from said second end of said gas outlet port, including a first gas vessel with a hollow interior in gas flow communication with said second end of said gas outlet port; and a second gas discharge assembly to receive gas flowing from said first end of said porous tube at said first end of said gas-liquid contactor assembly, including a gas outlet duct in gas flow communication with said interior chamber of said porous tube through said first end thereof, and a second gas vessel with a hollow interior in gas flow communication with said gas outlet duct.

32. The apparatus of claim 31, wherein the inside diameter of said gas outlet port is approximately ⅙ of the inside diameter of said at least one porous tube, and wherein the inside diameter of said gas outlet duct is approximately ⅙ of the inside diameter of said at least one porous tube.

33. The apparatus of claim 31, wherein the sum of the inside diameter of said gas outlet port and the inside diameter of said gas outlet duct is approximately ⅓ of the inside diameter of said at least one porous tube.

34. The apparatus of claim 31, wherein the number of said gas inlet ports is greater than one.

35. The apparatus of claim 34, wherein the number of said closed gas plenums formed by said at least one outer jacket is greater than one and wherein at least one gas inlet port is provided for introduction of gas to each of said closed gas plenums.

36. The apparatus of claim 35, wherein the number of said porous tubes is equal to the number of said closed gas plenums.

37. The apparatus of claim 31, wherein the cross-sectional dimension of said pores penetrating said at least one porous tube is within the range of about 0.5 micron to about 40 microns.

38. The apparatus of claim 31, wherein the cross-sectional dimension of said pores penetrating said at least one porous tube is within the range of about 0.5 micron to about 20 microns.

39. The apparatus of claim 31, wherein the cross-sectional dimension of said pores penetrating said at least one porous tube is within the range of about 0.5 micron to about 10 microns.

40. The apparatus of claim 31, wherein said degassing tube is of constant inside diameter from said first end thereof to said second end thereof.

41. The apparatus of claim 31, wherein said degassing tube decreases in inside diameter from said first end thereof to said second end thereof.

42. The apparatus of claim 31, wherein said degassing tube increases in inside diameter from said first end thereof to said second end thereof.

43. The apparatus of claim 31, wherein said liquid vessel, said first gas vessel, and said second gas vessel are interconnected in gas flow communication so as to equalize pressure thereamong.

44. The apparatus of claim 31, further comprising a pressure equalizing means for the purpose of equalizing the internal pressures in said liquid vessel, said first gas vessel, and said second gas vessel.

45. The apparatus of claim 44, wherein said pressure equalizing means includes a first conduit connected between said first gas vessel and said second gas vessel, and a second conduit connected between said first conduit and said liquid vessel.

* * * * *